United States Patent
Duane et al.

(10) Patent No.: US 6,243,721 B1
(45) Date of Patent: *Jun. 5, 2001

(54) METHOD AND APPARATUS FOR PROVIDING AUTOMATIC LAYOUT CAPABILITIES FOR COMPUTER FORMS

(75) Inventors: Nicholas P. Duane, Westborough, MA (US); Brian W. MacDonald, Bellevue, WA (US); Suryanarayanan Raman, Redmond, WA (US); Scott A. Thurlow, Kirkland, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,301

(22) Filed: Jan. 31, 1997

(51) Int. Cl.[7] ............................. G06F 17/30; G06F 17/00
(52) U.S. Cl. ............................ 707/505; 707/508; 707/517
(58) Field of Search ................................... 707/508, 517, 707/518, 510, 520, 505, 506, 507, 500, 526; 345/326, 342

(56) References Cited

U.S. PATENT DOCUMENTS 5,144,693 * 9/1992 Morgan ............................ 395/158
5,208,906 * 5/1993 Morgan ............................ 395/148
5,467,448 * 11/1995 Hilton et al. ....................... 395/148

* cited by examiner

Primary Examiner—Joseph H. Feild
Assistant Examiner—Alford W. Kindred
(74) Attorney, Agent, or Firm—Jones & Askew, LLP

(57) ABSTRACT

A system for providing automatic capabilities in creating a computer form containing control items. Upon selecting a control item to place on a computer form, preferred coordinates to position the control item is automatically determined. Next, the size of the new control item is automatically selected based on properties of the new control item and the size and location of surrounding control items. The new control item, and any intersecting control items, are then automatically adjusted to accommodate the new control item at the preferred coordinates. The adjustments include: (1) setting the width and height of the new control item; (2) identifying the space available to above and to the right of the preferred coordinates; and if the width or height of the new control item exceeds the space available, (3) adjusting the other control items to obtain additional space for the new control item. Alignment properties for the new control item are also automatically determined and assigned. Thus, when other control items on the computer form either moved or re-sized, the control item is adjusted in accordance with the alignment properties. Labels to identify the new control item may be automatically created and attached to the new control item. Furthermore, the labels are uniformly and control items are uniformly aligned on the computer form. Finally, control items can be repositioned manually without automatically relocating the control item.

65 Claims, 20 Drawing Sheets

METHOD AND APPARATUS FOR PROVIDING AUTOMATIC LAYOUT CAPABILITIES FOR COMPUTER FORMS

TECHNICAL FIELD

The present invention is generally directed to computer programs for creating and editing computer forms, and more particularly, relates to an improved interface for providing automatic layout capabilities when creating a new computer form or editing an existing computer form.

BACKGROUND OF THE INVENTION

With the widespread use of graphical interfaces in computer based applications, more flexibility is available in determining how information is entered by a user and displayed. "Computer forms" are the typical user interface that is used for entering and displaying information. Similar to paper forms, computer forms provide a two dimensional view of information Computer forms, however, also provide the capability for three dimensional viewing of information. Computer forms may consist of several text, graphics, control items, and other objects which simplify and organize the display of information and facilitate data entry. Examples of computer forms include e-mail messages, purchase orders, invoices, database entry forms, and financial tracking forms.

Designers of user interfaces are challenged by the requirement of creating generic, easily understandable, user interfaces that appeal to potential users. The success of a product in the market may relate to the "friendliness" of the user interface. Therefore, user interface designers try to meet the use requirements of the widest range of potential users. In an attempt to appeal to the widest range of potential users, some designers have integrated "user customizable" computer forms into their products. With this capability, users can tailor the appearance of a computer form to meet their individual requirements.

With a promising array of potential uses, user customizable forms are a valuable asset to a product The process of creating a form, however, can be difficult. Users must carefully align objects inserted onto the computer form, insert and align meaningful labels near the objects to indicate their purpose, and insure that the objects are large enough to display the required information. The construction of a typical computer form can consume a significant amount of the user's time. Therefore, it is desirable to provide a system that reduces the complexity and expedites the process of creating computer forms.

Many of the operations involved in creating computer forms are predictable. One such predictable operation is identifying the location to place an object on the computer form. Computer forms are generally created in a top down approach which means that objects appearing at the top of the form are entered first. In many applications, when an object is entered onto a form or into a window, the object is either placed at a generic location (such as the center of the form) or at a location selected by a pointing device such as a mouse pointer. Using this approach, an object must be inserted onto a form, moved to a desired location and then aligned with other objects. By automatically performing these operations, the process of creating a computer form can be simplified. Therefore, there is a need to provide a system that automates the process of identifying a location to place an object on a computer form.

Another predictable operation is determining the size of an object that has been placed on a computer form. Generally, the size of an object within a computer form may depend on the type or use of the object. For instance, a mail message computer form may contain one object which holds the name of the recipient, another for the subject of the mail message, and yet another for the text of the mail message. The name of the recipient and the subject of the message could conform to one object type while the text may conform to another object type. In previous solutions, the designer of the computer form would be required to place each of these objects and then adjust their size accordingly. This process again adds time and complexity to creating a computer form. Therefore, there also is a need to provide a system that automates the process of determining and adjusting the size of an object placed onto a computer form.

Another predictable operation is aligning objects that are placed onto a computer form. For aesthetic appearances, it is desirable for an array, consisting of a column or row of objects, to have their borders aligned with each other and to be uniformly spaced apart. As the number of objects in a computer form increases, this task can become tedious and time consuming. Because a typical user may desire to arrange objects in an aesthetically pleasing manner, the task of aligning and spacing the objects should be automated. Therefore, there also is a need to provide a system that automates the process of aligning and spacing objects that are placed onto a computer form.

Another predictable operation is attaching labels to objects that have been placed onto a computer form. Typically, a user is required to insert an object onto a computer form, insert a label to identify the object, align the object and the label, and then link the object and the label together. For complex computer forms, these operations can require a significant amount of time. Therefore, there is also a need to provide a system which automatically inserts, aligns, and links a label with an object when an object is inserted onto a computer form.

In some circumstances, a common computer form may be used by many different users. Depending on the specific uses, some users may want to modify certain aspects of the common computer form. Rather than having to create a new form, it is desirable to be able to modify a pre-existing form. For instance, a common e-mail computer form may include objects such as the recipients name, the senders name, the date the e-mail is sent, and a message box. If particular users desire to add a priority indicator at the top of the e-mail computer form, they must move each of the objects in order to create space for this additional object. The users then must insure that the moved objects and any labels associated with them are aligned and uniformly spaced. Similar operations must be performed if a user desires to rearrange the order of the objects on a computer form. Therefore, there is also a need to provide a system which automatically moves, aligns, and spaces previously-placed objects in a computer form when a new object inserted. Likewise, there is also a need for a system which automatically adjusts previously-placed objects on a computer form when one of the objects are moved.

Although uncommon, a user may desire to place objects on a computer form without having them aligned. Furthermore, a user may desire to create a computer form in a manner other than a top down approach. If the system for creating the forms automatically places and aligns the objects as they are entered onto the form or moved, this may frustrate the designer. Therefore, there is a desire to provide a system which automates the process of creating computer forms, yet allows a user to override the automatic alignment and positioning features of the system.

In view of the foregoing, there is a need for a system to provide automatic capabilities in creating user customizable computer forms. There is also a need to automate predictable operations involved in creating a custom computer form in order to reduce the time required and complexity involved in creating custom computer forms.

SUMMARY OF THE INVENTION

The present invention satisfies the above-described needs by providing a system which automates processes associated with creating computer forms. Predictable processes such as placing, aligning, sizing, and attaching labels to control items are performed automatically. This increases the efficiency of creating computer forms for various applications. Therefore, an advantage of the present invention is to provide a system that reduces the complexity and expedites the process of creating computer forms.

Generally, the present invention provides a method of automatically positioning a new control item which has been dragged to a drop-point of a computer form. First preferred coordinates for the position of the control item are determined. The preferred coordinates are determined relative to the drop-point. In determining the preferred coordinates, the computer form is viewed as a set of orthogonal X and Y axes with the preferred coordinates comprising an X coordinate and a Y coordinate and identifying an intersecting X axis and Y axis. The X coordinate of the preferred coordinates is determined by scanning to the left of the drop-point along the X axis intersecting the drop-point. When a boundary element is detected, the X coordinate of the preferred coordinates is then set relative to this boundary element. The Y coordinate of the preferred coordinates is determined by scanning above the X coordinate of the preferred coordinates on the. Y axis intersecting the X coordinate. When a boundary element is detected, the Y coordinate of the preferred coordinates is then set relative to this boundary element. The boundary element can be either a previously-placed control item or a margin of the computer form. The preferred coordinates are set relative to these boundary elements by leaving a gap space of 0 or more inches between the preferred coordinates and the boundary elements. Therefore, an advantage of the present invention is to provide a system that automates the process of identifying a location to place a control item on a computer form.

Secondly, once the preferred coordinates are determined, the new control item is position at the preferred coordinates. Thirdly, the new control item and any intersecting control items are adjusted to accommodate the new control item at the preferred coordinates. The adjustments include: (1) setting the width of the new control item; (2) identifying the space available to the right of the preferred coordinates; and (3) if the width of the new control item exceeds the space available, adjusting the other control items to obtain additional space for the new control item.

Setting the width of the control item is dependent upon the type of control item inserted on the computer form. A control item can be adjustable or have a fixed size. Additionally, the control item can be horizontally adjustable or X-axis-adjustable. If the control item is horizontally adjustable, the width of the control item is set to the larger value of either the amount of space available between the left and right margins of the computer form or to its minimum width. If the control item is not horizontally adjustable, the width is set to a predetermined value.

Identifying the space available to the right of the control item is accomplished by summing the amount of vacant space immediately to the right of the control item. If enough space is available to accommodate the control item then no further processing is required. If additional space needs to be obtained, items which are located to the right of the control item and that share any common X axis (X-axis-intersecting) are shifted towards the right margin of the computer form. Additionally, X-axis-intersecting control items to the left of the control item and the control item itself are shifted towards the left margin. Additional space can also be obtained by reducing the width of one or more X-axis-intersecting, horizontally adjustable control items or by reducing the width of the control item itself. After reducing the width of any control items, the shifting process previously described would then be performed.

The adjustments to accommodate the new control item at the preferred coordinates can also include: (4) setting the height of the new control item; (5) identifying the space available to below the preferred coordinates; and (6) if the height of the new control item exceeds the space available, adjusting the other control items to obtain additional space for the new control item.

Setting the height of the control item is dependent upon the type of control item inserted on the computer form. The control item can be vertically adjustable or Y-axis-adjustable. If the control item is vertically adjustable, the height of the control item is set to the larger value of either the amount of space available between the top and bottom margins of the computer form or to its minimum height. If the control item is not vertically adjustable, the height is set to a predetermined value.

Therefore, an advantage of the present invention is to provide a system that automates the process of determining and adjusting the size of a control item placed onto a computer form. Furthermore, it is an advantage of the present invention to provide a system that automates the process of aligning and spacing control items that are placed onto a computer form.

Identifying the space available below the control item is accomplished by summing the amount of vacant space immediately below the control item. If enough space is available to accommodate the control item then no further processing is required. If additional space needs to be obtained, items which are located below the control item and share any common Y axis (Y-axis-intersecting) are shifted towards the bottom margin of the computer form. Additionally, Y-axis-intersecting control items above the control item and the control item itself are shifted towards the top margin. Additional space can also be obtained by reducing the height of one or more Y-axis-intersecting, vertically adjustable control items or by reducing the height of the control item itself. After reducing the height of any control items, the shifting process previously described would then be performed.

Additionally, the present invention can identify and assign alignment properties to a new control item. The new control item is set to be right-aligned if it intersects and is located completely to the right of a horizontally adjustable control item or a right-aligned control item. The new control item is set to be bottom-aligned if it intersects and is located completely below a vertically adjustable control item or a bottom-aligned control item.

Another aspect of the present invention is identifying the horizontal line at which a new control item is to be entered. This process includes sorting the previously-placed control items on the computer form by the Y coordinate and then by the X coordinate of their preferred coordinates. Each control item is then selected according to the sorted order and examined to identify a control item which is most proximate to the drop-point. When a most proximate control item is identified, the horizontal line is identified relative to that control item.

The most proximate control item is determined by first identifying the dimensions of a left-side gap of a control item. The drop-point is considered to be most proximate to the control item if it is located in or above the left-side gap. In addition, the drop-point is considered to be most proximate to the control item if it is located within the left half of the control item or above the control item. Furthermore, if the control item is at the end of a horizontal line, the dimensions of a right-side gap are determined. Again, the drop-point is considered to be most proximate to the control item if it is located in or above the right-side gap.

Once a control item is identified as the most proximate control item, the line at which to insert the control item is determined relative to the most proximate control item. This process includes identifying the insertion line or insertion-point with respect to the horizontal line containing the most proximate control item if the drop-point is located in the left-side gap, right-side gap, or the left half of the most proximate control item. If the drop-point is above the left-side gap, right-side gap, or the most proximate control item, the insertion-point is set to the line preceding the most proximate control item.

Another aspect of the present invention is to provide a system for adjusting control items on a computer form when one of the control items is either moved or re-sized. This process includes receiving new preferred coordinates for the modified control item; determining the new dimensions of the modified control item; and adjusting any related control items to accommodate the modified control item. Related control items include control items which intersect with another control item.

The process of adjusting related control items involves shifting right-aligned related control items located to the right of a modified control item. The control items are shifted so that a gap equal to or greater than 0 inches is located between the right-aligned related control items and the modified control item. Additionally, this process involves shifting bottom-aligned related control items located below the modified control item. The control items are again shifted so that a gap equal to or greater than 0 inches is located between said bottom-aligned related control items and the modified control item. Therefore, an advantage of the present invention is to provide a system which automatically moves, aligns, and spaces previously-placed objects in a computer form when a new object inserted. Likewise, an advantage of the present invention is to provide a system which automatically adjusts previously-placed objects on a computer form when one of the objects are moved.

Another aspect of the present invention is to automatically create a label to be associated with a new control item. This process involves creating a new label box in response to detecting a new control item being placed onto the computer form. The new label box is then placed on the computer form and aligned with the new control item. Finally, the label box and the control item are linked together to operate as a single item.

Another aspect of the present invention is providing a system for uniformly aligning labels and control items on the computer form. This process involves partitioning the computer form into a set of vertical partitions. The labels are then aligned on the left boundary of the vertical partition containing the insertion-point. Next, the new control items are aligned on the left most edge of the next partition located to the right of its associated label and which is not covered by any portion of the label. The vertical partitions can be of varying sizes or can be of a uniform width. Therefore, an advantage of the present invention is to provide a system which automatically inserts, aligns, and links a label with an object when an object is inserted onto a computer form.

Another aspect of the present invention is providing a system which will allow control items to be repositioned manually without automatically relocating the control item. This process involves receiving an instruction to modify a control item which is located on the computer form. If the instruction includes a request to move the control item, the preferred coordinates for the control item are set to the location where the control item was moved. Thus, a user can reposition control items at any location. Therefore, an advantage of the present invention is to provide a system which automates the process of creating a computer form, yet, allows a user to override the automatic alignment and positioning features of the system.

These and other aspects, features and advantages of the present invention will be more clearly understood and appreciated from a review of the following detailed description of the present invention and possible embodiments thereof, and by reference to the appended drawings and claims.

DETAILED DESCRIPTION

Figure 1:
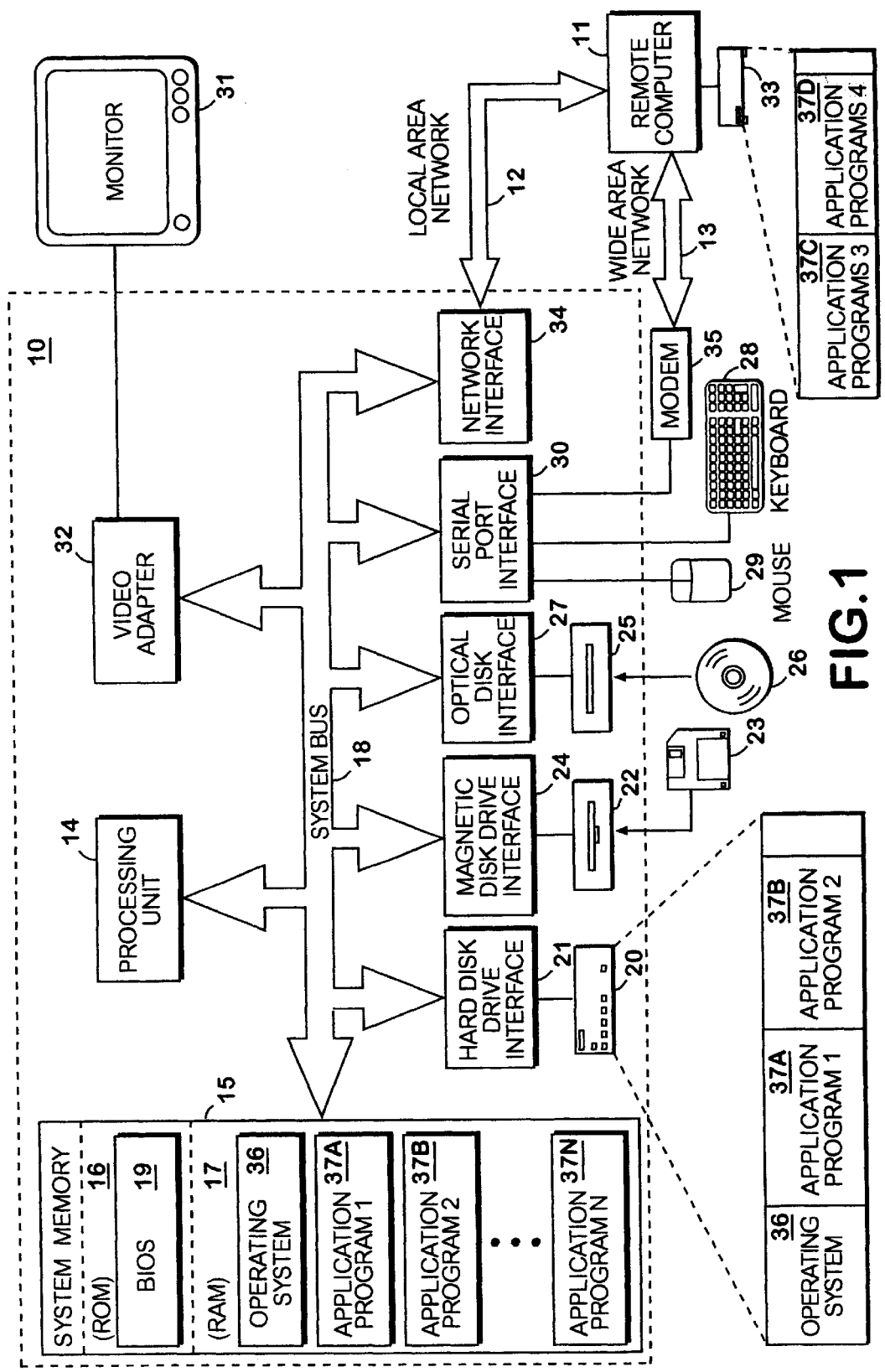
FIG. 1 is a block diagram of a personal computer that provides an operating environment for the preferred embodiment of the present invention.

The present invention provides a method and a system to automate operations involved in creating customized computer forms. The preferred embodiment of the present invention is represented by the "WINDOWS 97" version of the "MICROSOFT OUTLOOK" program, an information management program published by Microsoft Corporation of Redmond, Wash. Briefly described, the preferred program allows users to enter, organize, store, retrieve, and display information. User customizable computer forms are used for entering and displaying this information. To reduce the amount of time users spend designing and creating the computer forms, the preferred program includes an "Auto-Layout" feature which automatically positions objects on a computer form, aligns objects in relationship to each other, and automatically binds labels to objects. This process simplifies the creation process and assists users in creating computer forms with a professional appearance.

The functions provided by the AutoLayout feature can be viewed in three categories: (1) Automatic Placement of Control Items; (2) Automatic Repositioning on Re-size and Override Capability of AutoLayout operations; and (3) Automatic Association and Alignment of Labels with Control Items. Following is a description of the context in which the preferred program can exist. Following this is a description of each of the functions included in these AutoLayout categories.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit (PU), memory storage devices for the PU, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the PU via a communications network.

The processes and operations performed by the computer include the manipulation of signals by a PU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, flags, variables, parameters, objects, properties, tags, types, identifiers, values, elements, symbols, characters, terms, numbers, points, records, images, files, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc. which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein. The specialized apparatus could consist of dedicated computer systems in a specific network architecture with hard-wired logic or programs stored in nonvolatile memory, such as read only memory, magnetic storage devices, or optical storage devices.

Referring now to the drawings, in which like numerals represent like elements throughout the several figures, aspects of the present invention and the preferred operating environment will be described.

The Operating Environment

FIG. 1 illustrates a conventional personal computer 10 suitable for supporting the operation of the preferred embodiment of the present invention. As shown in FIG. 1, the personal computer 10 may operate in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a processing unit (PU) 14, such as the 80486 or "Pentium" microprocessors manufactured by Intel Corporation of Santa Clara, Calif. The personal computer also includes system memory 15

(including read only memory (ROM) 16 and random access memory (RAM) 17), which is connected to the PU 14 by a system bus 18. The preferred computer 10 utilizes a BIOS 19 (Basic Input/Output System), which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively. Additionally, the present invention is not limited to computers that utilize ROM or RAM for system memory. Other technologies such as electronically programmable ROM (EPROM), ultraviolet light erasable and electronically programmable ROM (UVEPROM), electronically erasable and programmable ROM (EEPROM), FLASH and bubble memory may also be used.

Within the personal computer 10, various devices may be connected to enhance the utility and performance of the personal computer. A local hard disk drive 20 may be connected to the system bus 18 via a hard disk drive interface 21. A floppy disk drive 22, which is used to read or write a floppy disk 23, may be connected to the system bus 18 via a floppy disk drive interface 24. A CD-ROM drive 25, which is used to read a CD-ROM disk 26, may be connected to the system bus 18 via a CD-ROM interface 27. A user enters commands and information into the personal computer 10 by using input devices such as a keyboard 28, and/or pointing devices such as a mouse 29. Typically, these input devices are connected to the system bus 18 via a serial port interface 30 or a parallel port interface (not shown in FIG. 1). Other types of pointing devices (not shown in FIG. 1) include track pads, track balls, pens, head trackers, data gloves, and other devices suitable for positioning a cursor on a computer monitor 31. A monitor 31 or other kind of display device may be connected to the system bus 18 via a video adapter 32.

The personal computer may be connected to a network of other computers or devices. A remote computer 11 in a networked environment is connected to a remote memory storage device 33. This remote memory storage device 33 is typically a large capacity device such as a hard disk drive, CD-ROM drive, magneto-optical drive, or the like. The personal computer 10 may be connected to the remote computer 11 by a network interface 34, which is used to communicate over the local area network 12.

The personal computer 10 may also be connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to a remote computer 11 via either the local area network 12 and the wide area network 13 is not required, but merely illustrates methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37a–n, and data are provided to the personal computer 10 via computer-readable media. In the preferred computer, the computer-readable media include the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is used to store data and programs, including the operating system and programs. The application programs 37a–n, may include commercially available utilities, public domain software utilities, computer games, etc. The preferred embodiment of the present invention, a spreadsheet program, is an example of one such application program.

The Operating System

Figure 2:
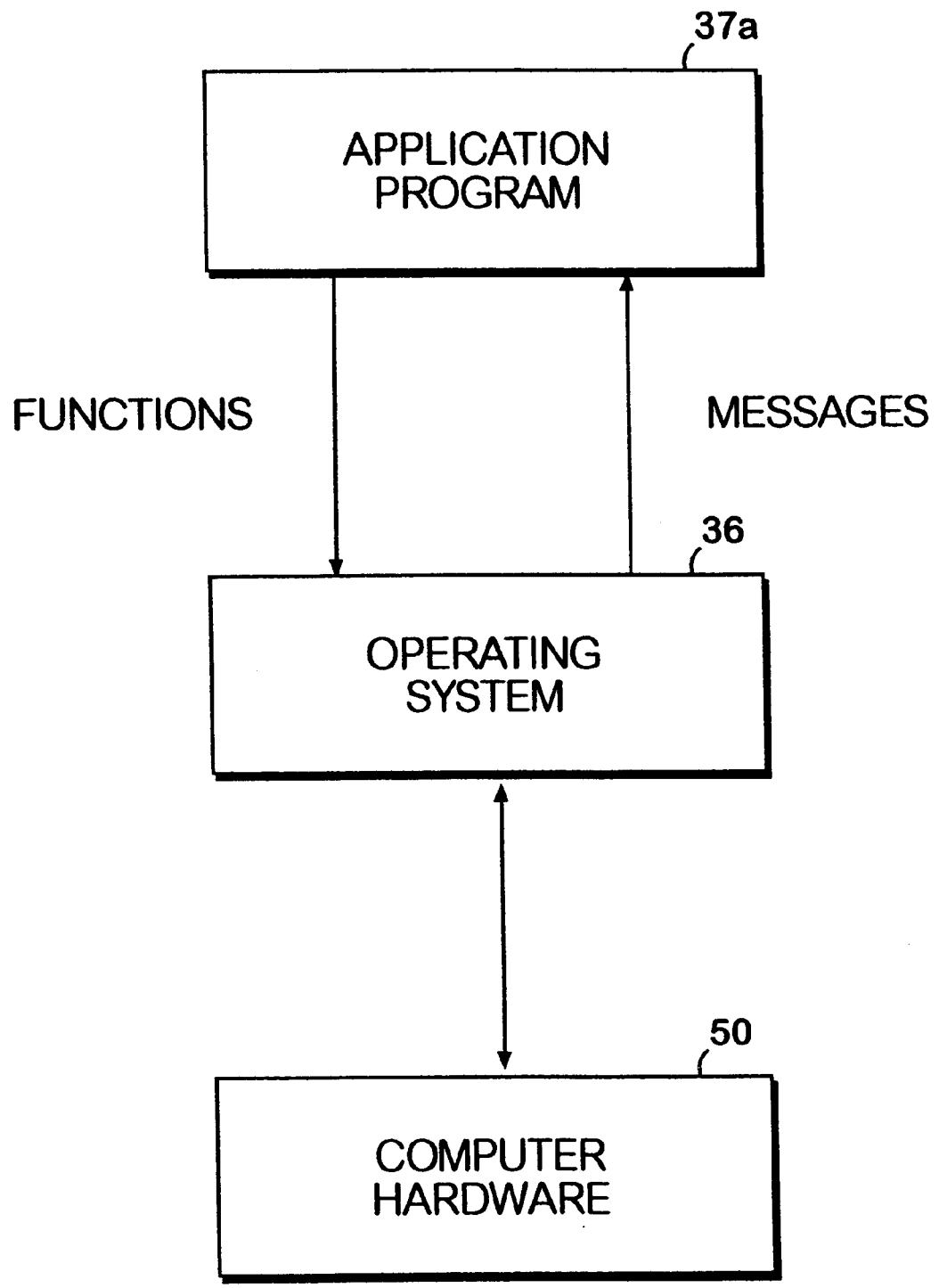
FIG. 2 is a block diagram illustrating the interface between a computer's input/output devices, an operating system, and an application program.

FIG. 2 is a simplified block diagram illustrating the interaction between the preferred computer hardware 50, the preferred operating system 36, and an application program 37a. Referring now to both FIGS. 1 and 2, when the personal computer 10 is turned on or reset, the PU 14 is forced to begin program execution at a specific memory location in the ROM 16. This specific memory location corresponds to the beginning of the bootstrap routine contained in the BIOS 19. The bootstrap routine functions to load the operating system 36 from the hard disk drive 20 into the RAM 17. Once the operating system 36 is loaded into RAM 17, the PU 14 executes instructions of the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the application program 37a. The operating system 36 interprets and carries out instructions issued by the user and/or application program(s). For example, when the user wants to load an application program 37a, the operating system 36 interprets the instruction (e.g., double clicking on the application program's icon) and causes the PU 14 to load the program code into RAM 17 from either the local hard disk drive 20, floppy disk 23, CD-ROM 26, or the remote memory storage device 33. Once the application program 37a is loaded into the RAM 17, it is executed by the PU 14. For larger programs, the operating system 36 causes the PU 14 to load various portions of program, or program modules, into RAM 17 as needed. In addition, several applications programs (37a–n) can be loaded into RAM at the same time. In this scenario, the operating system 36 will switch the PU 14 execution time between applications based on user requests, application program request, or by a time-sliced allotment of the processing time of PU 14.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message, by executing a requested task, and/or by communicating with necessary hardware components 50.

From this brief description, it should be appreciated that operating systems, such as "WINDOWS 95" and "WINDOWS NT", are quite complex and provide a wide variety of services that allow users and programs to utilize the resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" and "Advanced Windows" published by Microsoft Press.

The preferred embodiment of the present invention is implemented in "MICROSOFT OUTLOOK" for "WINDOWS 97". It should be understood that the present invention can readily be implemented in other applications running under other operating systems, such as Microsoft Corporation's "Windows 3.1", IBM Corporation's "OS/2", UNIX based operating systems and the operating system used in "MACINTOSH" computers manufactured by Apple Computer, Inc.

Automatic Placement of Control Items

The preferred program provides a method to simplify the process of creating, modifying, and editing a computer form. This is accomplished by automatically performing intelligent alignment operations when items are selected and entered onto a new computer form.

Figure 3:
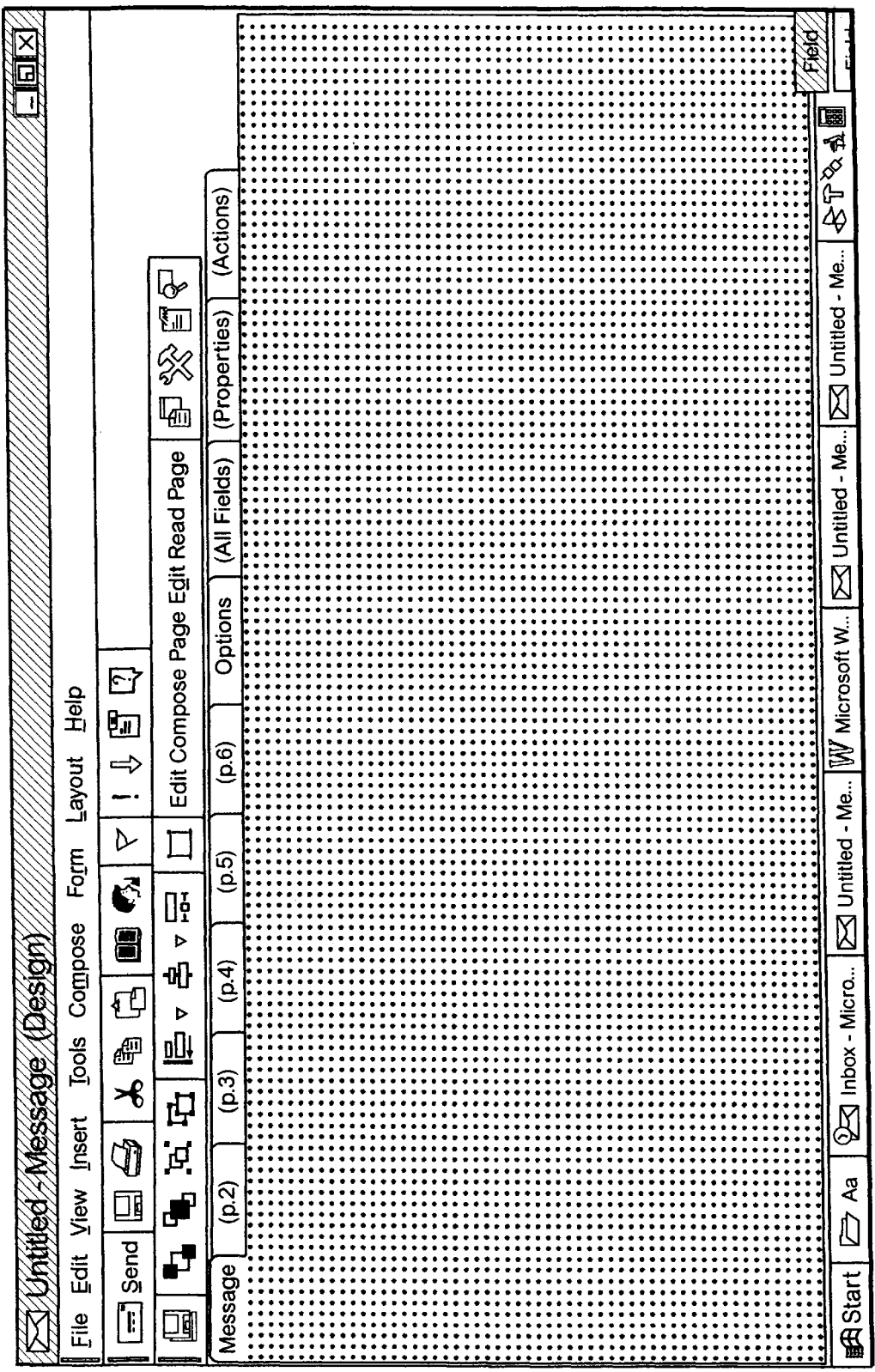
FIG. 3 is a diagram illustrating a display screen of a blank window which is typical to the preferred program.
Figure 4:
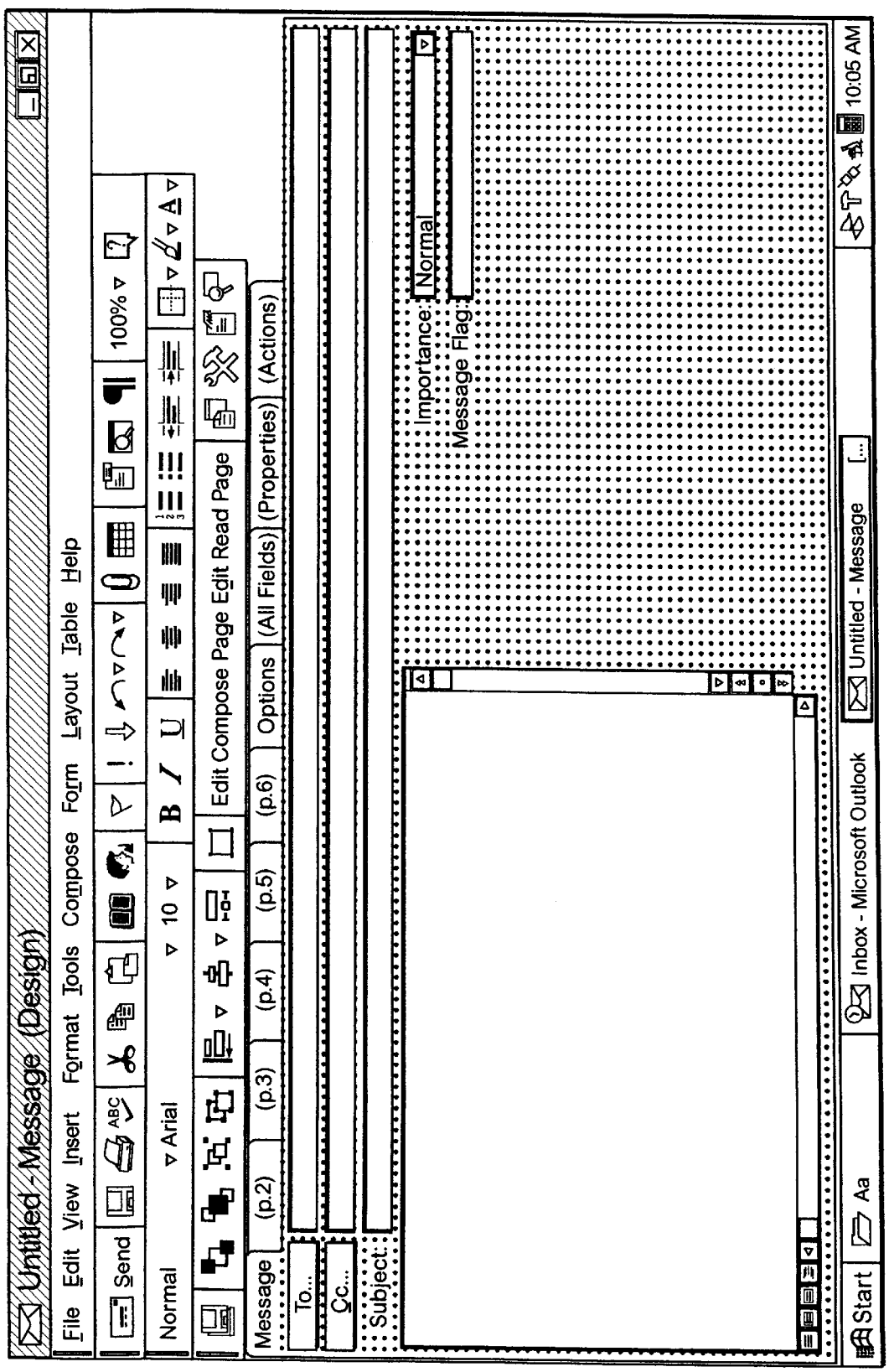
FIG. 4 is a diagram of a typical computer form created using the preferred program.

Users attempting to create a computer form using the preferred program are presented with a blank window on which they can insert a variety of control items. FIG. 3 is a diagram illustrating a display screen of a blank window which is typical to the preferred program. To facilitate the creation process, the preferred program allows pre-defined or custom-built control items to be entered onto a computer form. Several types of control items may be entered including the following types: Labels, Text Boxes, Combo Boxes, List Boxes, Check Boxes, Option Buttons, Toggle Buttons, Frames, Command Buttons, Tab Strips, Multiple Pages, Scroll Bars, Spin Buttons, and Graphic Images. FIG. 4 is a diagram of a typical computer form created using the preferred program.

Figure 5:
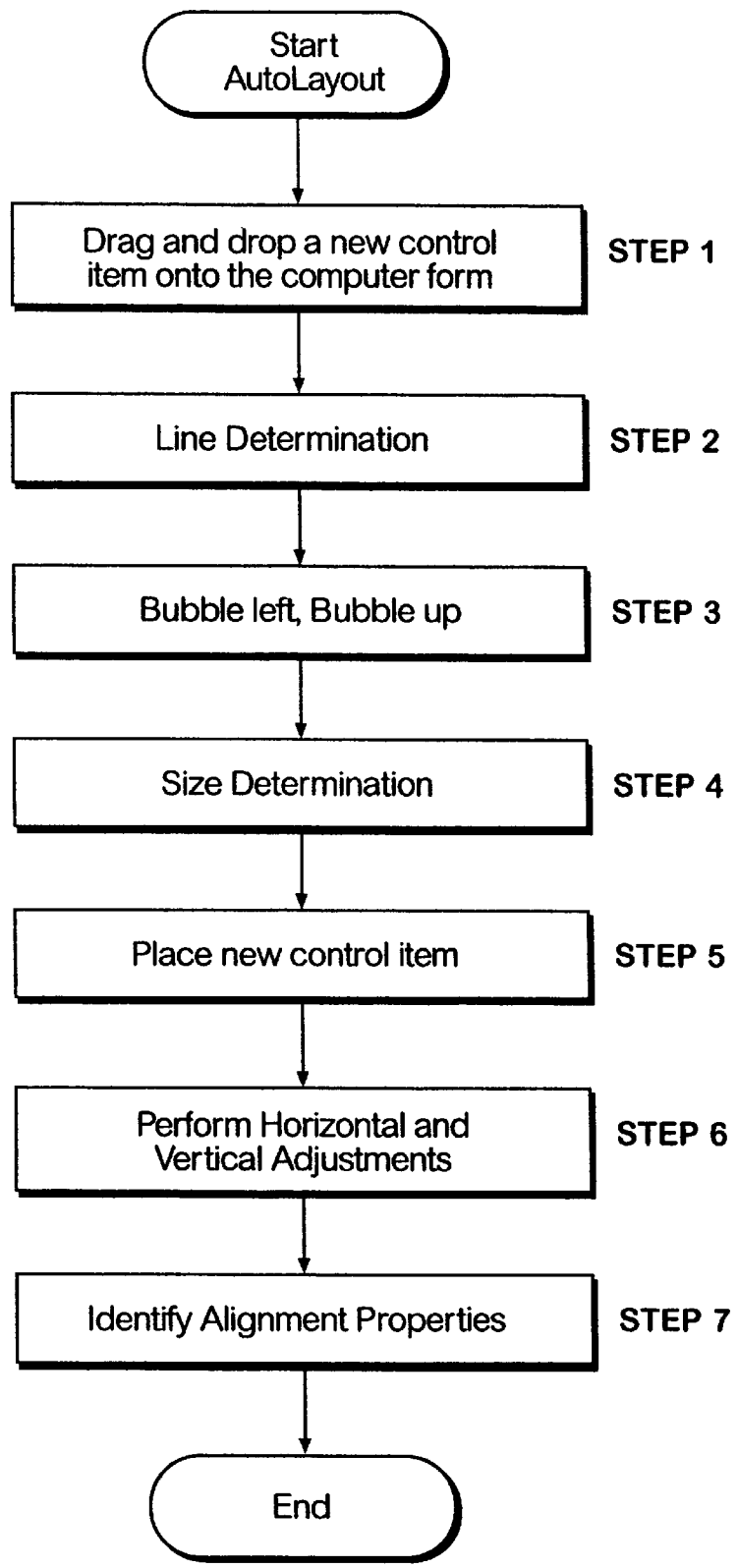
FIG. 5 is a flow chart diagram illustrating the seven (7) major steps involved in the preferred program.

Turning now to FIG. 5, the flow chart diagram illustrates the seven (7) major steps involved in the preferred program. These steps are described below.

(Step 1) Select and insert a new control item.

(Step 2) Line Determination Algorithm. Determine the line on which to insert the new control item based on the area where the new control item was entered.

(Step 3) Bubble Left, Bubble Up Algorithm. Determine where to position the new control item on the line identified in step 2.

(Step 4) Determine the size of the new control item.

(Step 5) Place the new control item at the position identified in step 3.

(Step 6) Perform any required adjustments to accommodate the new control item on the computer form.

(Step 7) Identify and assign alignment properties to the new control item.

Steps 2–4 and 6–7 comprise the main aspects of the invention. In step 2, a "Line Determination" algorithm is used to determine on which line to place a new control item. In step 3, a "Bubble Left, Bubble Up" algorithm is used to determine the preferred coordinates on the line for placement of the new control item. In steps 6–7, a series of algorithmic decisions are employed based on where the new control item has been placed in relationship to previously-placed control items.

Figure 6:
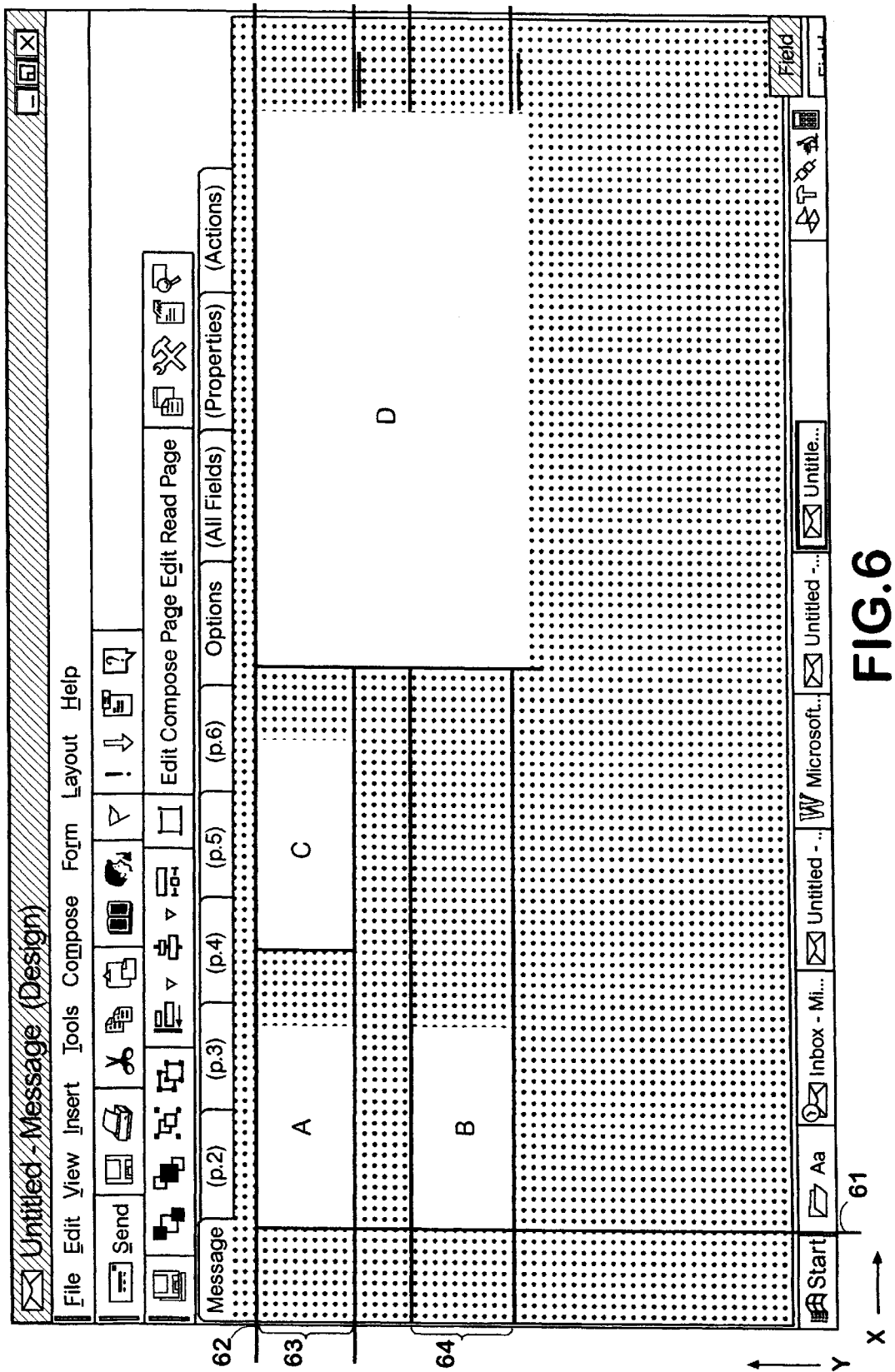
FIG. 6 is a diagram illustrating a computer form as an X-Y coordinate system.

Prior to describing the details of these algorithms, several terms and concepts must be defined. The computer form can be viewed as an X-Y coordinate system with the X-axis running horizontally and the Y-axis running vertically. FIG. 6 is a diagram illustrating the computer form as an X-Y coordinate system. The lines drawn for the X-axis 62 and the Y axis 61 are provided for illustrative purposes and do not generally appear on the computer form. In some applications, a grid, similar to the X and Y axes may be provided during the edit process to facilitate the design process.

Two control items are defined as left aligned if their left borders share a common a Y-axis. Control items A and B in FIG. 6 are left aligned and share common Y-axis 61. Two control items are top aligned if their top borders share a common X-axis. Control items A, C and D in FIG. 6 are top aligned and share a common X-axis 62.

Another way to view the computer form is as a series of horizontal lines. Depending on the size of a control item, it may span several of these horizontal lines. Two control items exist on the same horizontal line if their top borders are aligned or share a common X-axis. Control items A, C, and D in FIG. 6 exist on the same horizontal line 63, and control item B is on a separate horizontal line 64. Although control item D spans over two horizontal lines 63–64, it is top aligned with control items A and C, and therefore, exists on the same horizontal line 63 as control items A and C.

A first control item intersects with a second control item along the X-axis if any portion of the second control item shares a common X-axis with the first control item. Thus, control item A only intersects with control items C and D along the X-axis; however, control item D intersects with control items A, B and C along the X-axis. Similarly, a first control item intersects with a second control item along the Y-axis if any portion of the second control item shares a common Y-axis with the first control item. Thus, control item A intersects with control item B along the Y-axis.

Two control items are considered to be related if they intersect with each other on either the X-axis or the Y-axis. Control items B, C, and D are related to control item A and control items A and D are related to control item C.

The location of a control item is defined by the X-Y coordinate of the top left-hand corner of a rectangle encompassing the control item. The preferred coordinates of a control item are the X-Y coordinate at which the preferred program selects to place the control item.

Step 1: Select and Insert a New Control Item

Figure 7:
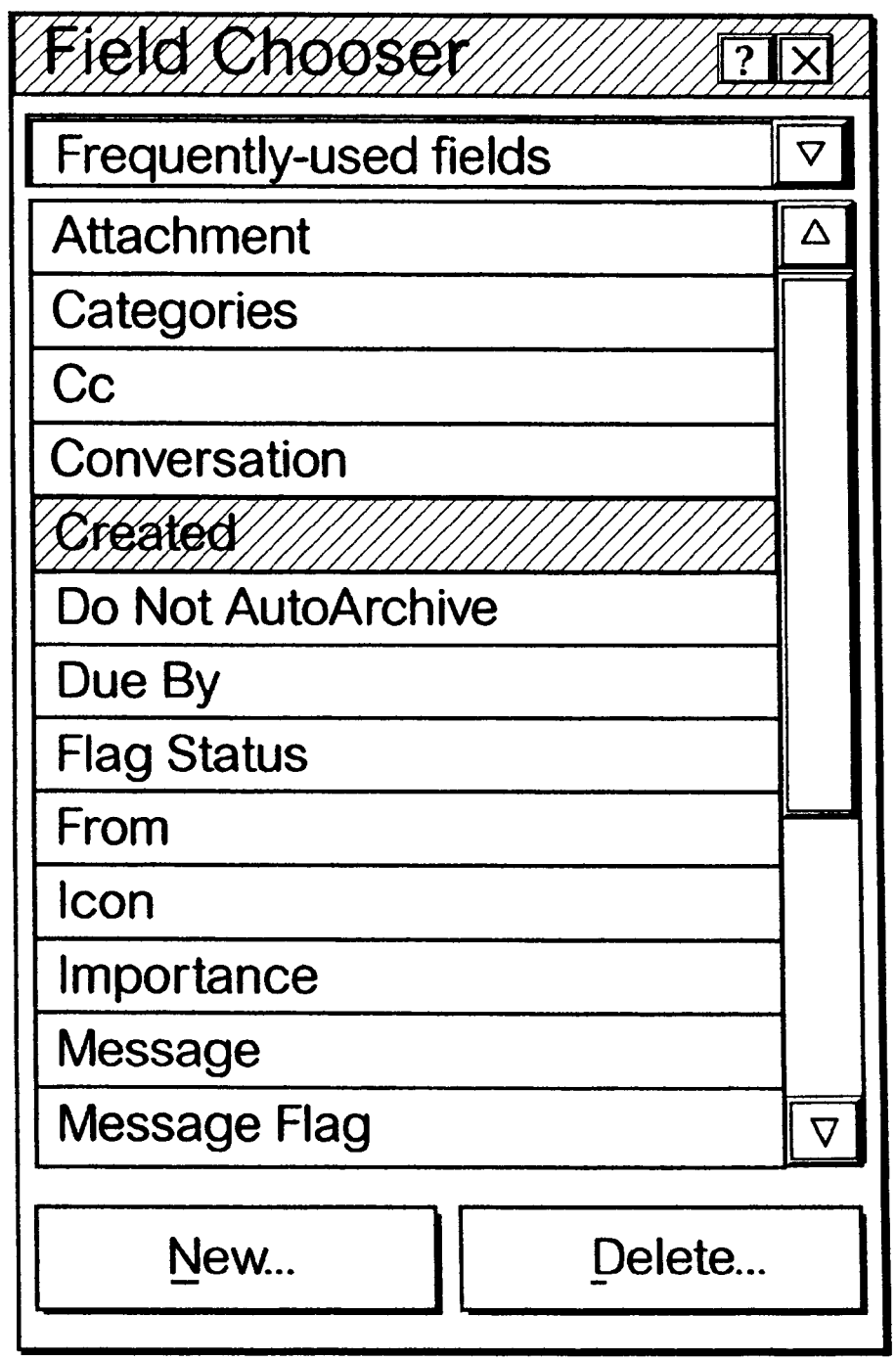
FIG. 7 is a diagram illustrating a display screen of a Field Chooser Window.

To create a computer form, users may select control items from a list of available control items (i.e. a "Field Chooser Window") or from a pull down menu bar. This is illustrated as step 1 in FIG. 5. FIG. 7 is a diagram illustrating a display screen of a Field Chooser Window. After selecting a control item, the user places it onto the computer form. One method to implement this process is referred to as "dragging and dropping". Those skilled in the art will recognize the term "dragging" to include the process of moving a display pointer (via a mouse pointer or similar pointing device) to the desired item to be selected, pressing a button on the pointing device to select the desired item, then while holding the button down, moving the display pointer to a location to insert the selected item. The term "dropping" will be recognized as referring to the process of releasing the button on the pointing device when the pointer is located over the desired location.

Upon dragging and dropping a selected control item onto a point on the computer form "drop-point", processing will continue with step 2 of FIG. 5.

Step 2: Line Determination Algorithm

Figure 8A:
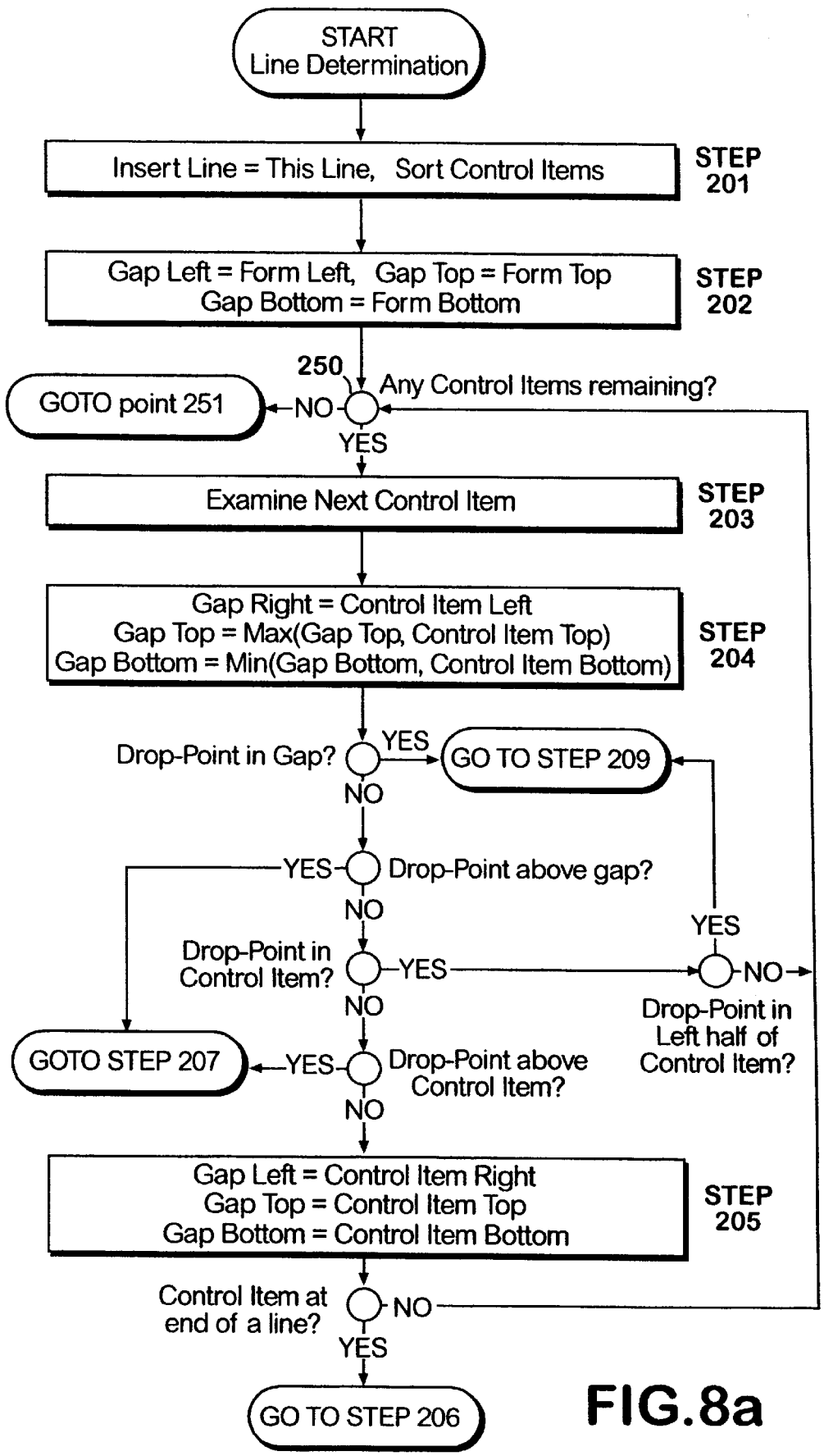
FIGS. 8a–b are flow chart diagrams illustrating the detailed steps of the Line Determination algorithm (step 2 of FIG. 5).
Figure 8B:
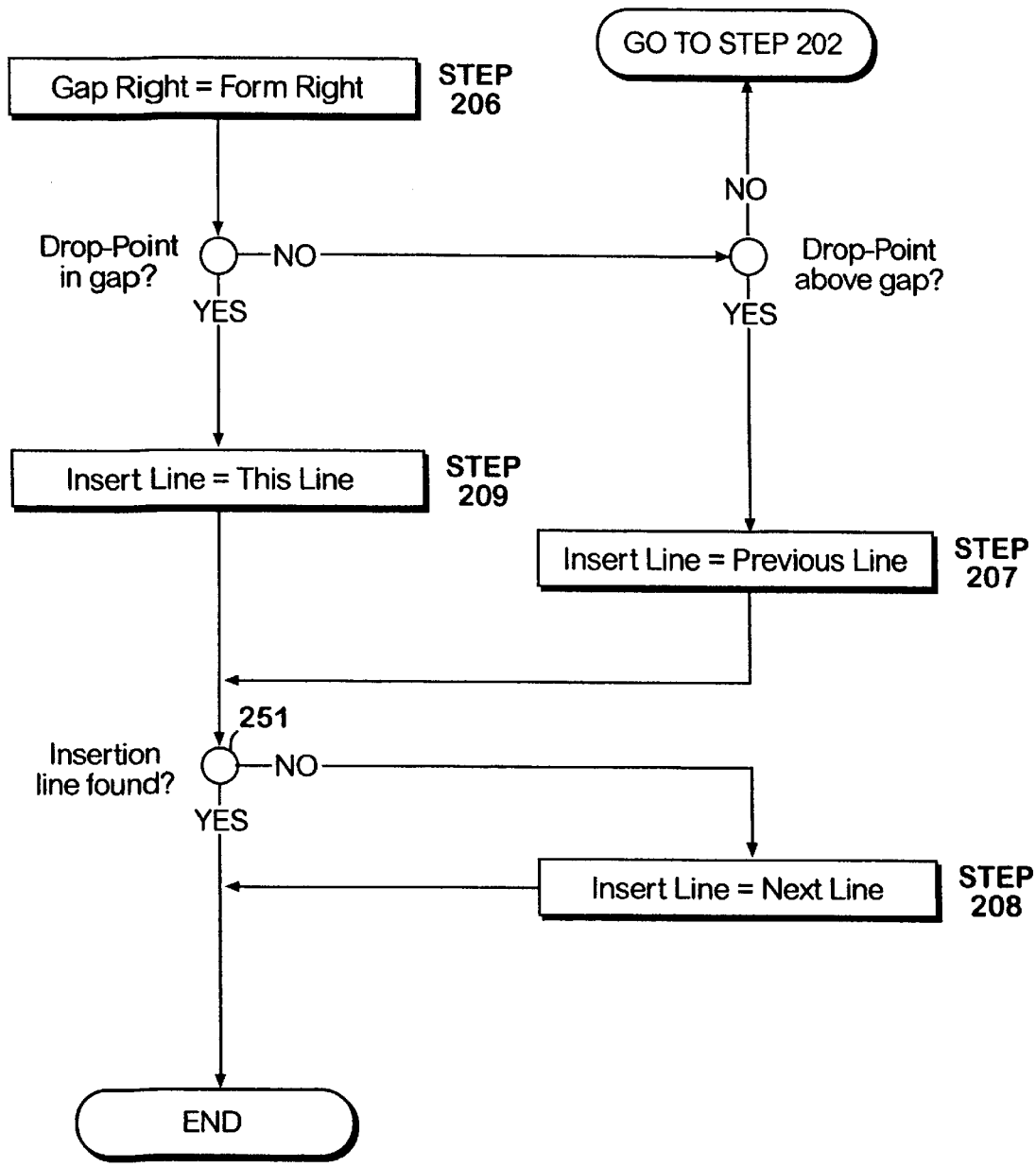
Figure 9:
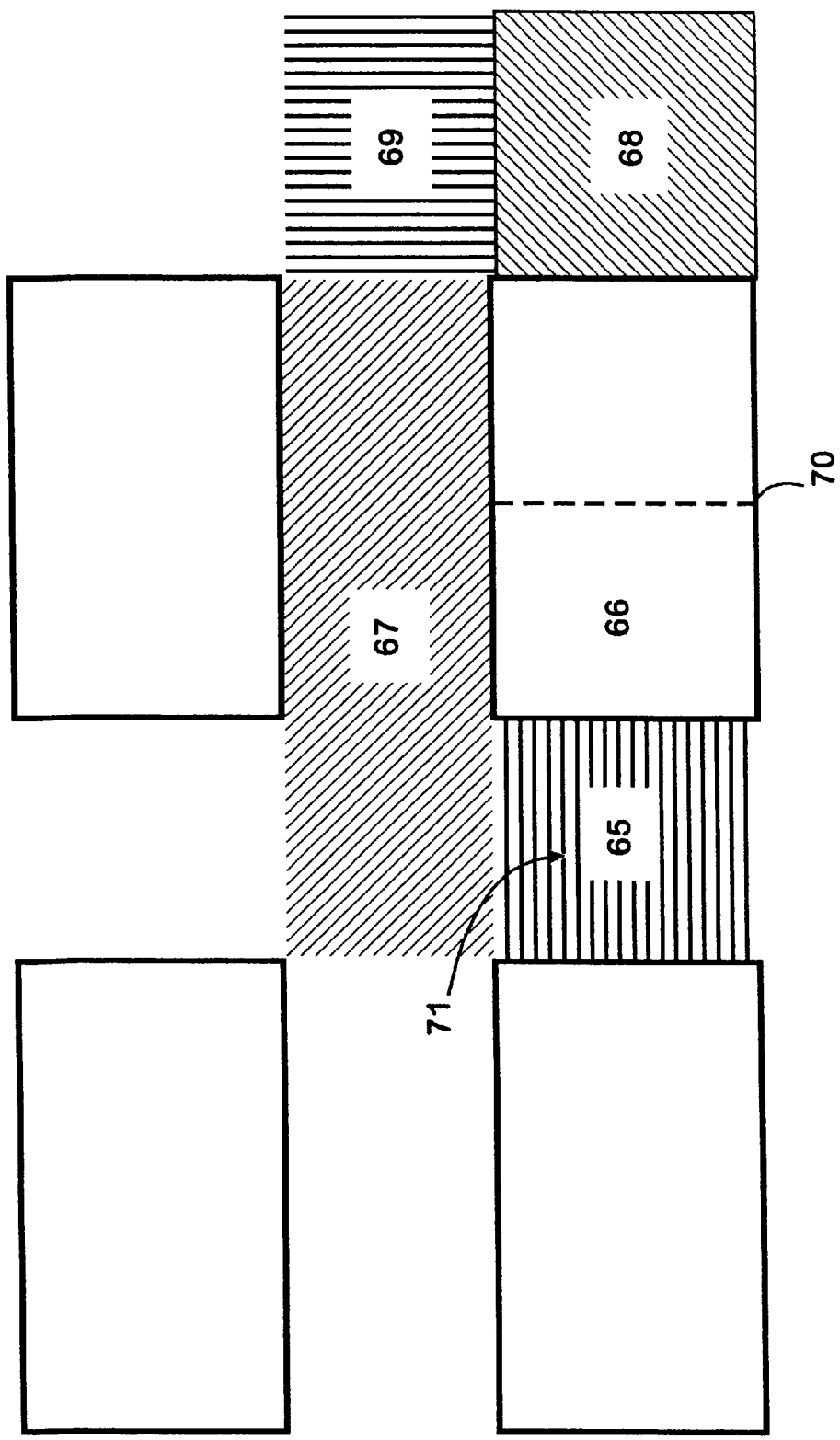
FIG. 9 is a diagram illustrating the possible locations where a drop-point can be located in relationship to a control item.

FIGS. 8a–b are flow chart diagrams illustrating the detailed steps of the Line Determination algorithm. Generally, in executing this algorithm, each of the control items on the computer form are examined in order to identify a control item that is "most proximate" to the drop-point. Then, the line for the new control item is selected based on the relationship between the drop-point and the most proximate control item. FIG. 9 is a diagram illustrating the possible locations where the drop-point can be in relationship to a control item. Each control item has a zone consisting of several areas. If the drop-point falls within that zone, then the control item is considered to be the most proximate control item. In FIG. 9, a control item 70 is shown as having a zone which includes a left-side gap 65, a left half 66, and an upper gap 67. Additionally, if the control item 70 is located at the end of a line, the zone also includes a right-side gap 68 and a right-side upper gap 69. Thus, is a drop-point if found to lie within the zone 65–69, then the control item 70 is the most proximate control item to the drop-point. In FIG. 9, the drop-point 71 is located in the left-side gap 65, and thus, the control item 70 is the most proximate control item to the drop-point 71.

In step 201 of FIG. 8a, the "Insert Line" variable is initialized to "Not Found" indicating that unless otherwise determined, the new control item will be inserted onto the last line of the computer form. Also, in step 201, each of the control items are sorted. In the preferred program, the sorting is accomplished by ordering the control items by the Y coordinate of their preferred coordinates and then by the X coordinate. This results in ordering the control items as they appear on the lines of the computer form starting with the upper left-hand corner and moving to the right. Upon reaching the end of the horizontal line, the control item at the beginning of the next line appears next in the order and then continuing with the control items to the right.

Four variables are used to define the gap areas of a control item. These variables are "Gap Left", "Gap Top", "Gap Right" and "Gap Bottom". Each of these variables define a border of a rectangular gap area associated with a control item. In step 202, three of these variables are initialized as follows:

"Gap Left" is initialized to the left side of the computer form, "Form Left";

"Gap Top" is initialized to the top of the computer form, "Form Top"; and

"Gap Bottom" is initialized to the bottom of the computer form, "Form Bottom".

Each of the control items are examined in the order defined in step 201 to identify a most proximate control item. If any control items remain that have not been examined, processing continues in step 203.

In step 203, the next control item is selected and processing continues at step 204. In step 204, the left-side gap is determined for the currently selected control item. The left-side is determined by setting the variables as follows:

"Gap Right" is set to the left border of the control item, "Control Item Left";

"Gap Top" is set to the maximum of either the current "Gap Top" or the top border of the control item, "Control Item Top";

"Gap Bottom" is set to the minimum of either the current "Gap Bottom" or the bottom border of the control item, "Control Item Bottom"; and "Gap Left" remains at it's previous value.

If the drop-point is located within the borders of the defined gap, then the current control item is the most proximate control item, and processing continues in step 209. In step 209, "Insert Line" is set to "This Line" to indicate that the new control item will be inserted on the horizontal line containing the most proximate control item. Thus, at point 251, the horizontal insertion line has been found and the Line Determination algorithm is completed.

If the drop-point is not within the borders of the gap but is above the gap and within the X dimensions of the gap, then the current control item is the most proximate control item and processing continues at step 207. Because the drop-point is above the most proximate control item, "Insert Line" is set to the line previous to the most proximate control item, "Previous Line" in step 207. At point 251 (FIG. 8b), the horizontal insertion line has been found, therefore, the Line Determination algorithm is completed.

If the drop-point is located within the borders of the current control item and within the left half of the control item, then the current control item is the most proximate control item and processing continues at step 209 as described above.

If the drop-point is located above and within the X dimensions of the current control item, then the current control item is the most proximate control item and processing continues in step 207 as described above.

If the drop-point is located within the control item but is not located within the left half, then processing continues at point "A." If additional control items remain to be examined, then processing resumes with step 203.

If the drop-point is not located in or above the left-side gap, in the left half of the control item, or above the control item, then the definition of the gap is changed in step 205 as follows:

"Gap Left" is set to the right border of the control item, "Control Item Right";

"Gap Top" is set to the top border of the control item, "Control Item Top"; and

"Gap Bottom" is set to the bottom border of the control item, "Control Item Bottom".

If the current control item is not located at the end of a line, then processing returns to point 250, and if additional control items remain to be examined, step 203 is entered. If the current control item is located at the end of a line, processing continues at step 206.

In step 206, the "Gap Right" is set to the right margin of the computer form, "Form Right", which completes the definition of the right-side gap of the current control item. If the drop-point is located in or above the right-side gap, then the current control item is the most proximate control item. If the drop-point is within the right-side gap, then processing continues at step 209 as described above. If the drop-point is above and within the X dimensions of the right-side gap, then processing continues at step 207 as described above. If the drop-point is neither within or above the right-side gap, then processing continues at step 202.

In step 202, the control item at the beginning of the next line will be the next control item to be examined. Therefore, the gap is reset to its default (maximum) size by defining the gap as follows:

"Gap Left" is set to the left margin of the computer form, "Form Left";

"Gap Top" is set to the top margin of the computer form, "Form Top";

"Gap Bottom" is set to the bottom margin of the computer form, "Form Bottom"; and "Gap Right" maintains its current value.

If any control items remain that have not been examined, processing continues in step 203.

If each of the control items have been examined without identifying a most proximate control item (i.e., "Insert Line"="Not Found"), then step 208 is entered prior to exiting the Line Determination algorithm. In step 208, "Insert Line" is set to "Next Line" which is the next horizontal line after the last examined control item. Thus, the horizontal insertion line for the new control item will be the first empty horizontal line below the bottom most control item.

Upon identifying the horizontal line to insert the new control item, processing will continue with step 3 of FIG. 5.

Step 3: Bubble Left, Bubble Up Algorithm

Figure 10:
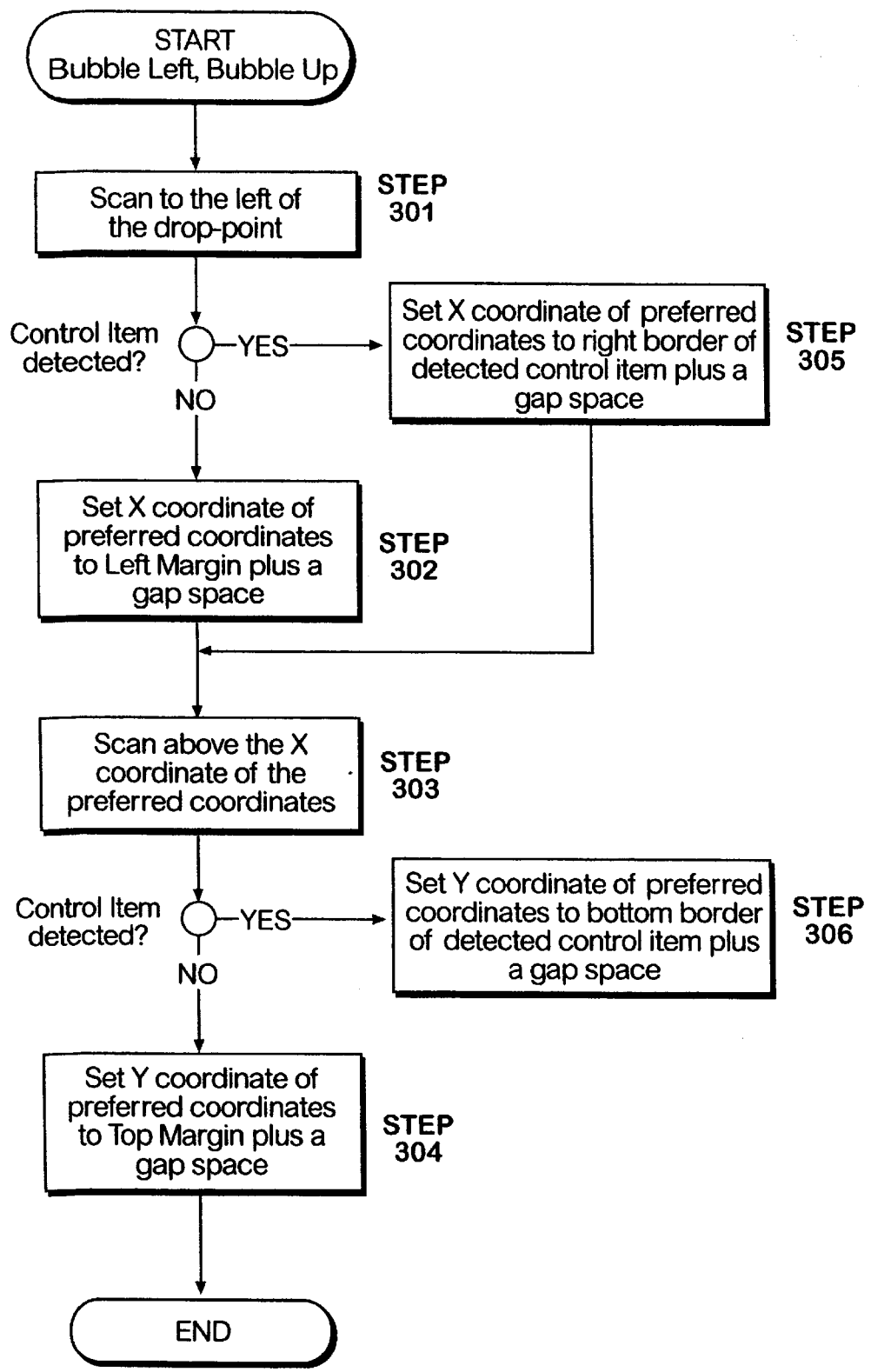
FIG. 10 is a flow chart diagram illustrating the steps of the Bubble Left, Bubble Up algorithm (step 3 of FIG. 5).

FIG. 10 is a flow chart diagram illustrating the steps of the Bubble Left, Bubble Up algorithm. Once the insertion line has been identified, the preferred X-Y coordinates to place the new control item must be determined. The preferred program uses the Bubble Left, Bubble Up algorithm to perform this process.

In step 301, a scan to the left, on the X-axis intersecting with the drop-point, is executed to identify a boundary element. The boundary element can be either a previously-placed control item or the left margin of the computer form. If a previously-placed control item is detected, processing continues at step 305. If the left margin of the computer form is detected, processing continues at step 302.

In step 305, the X coordinate of the preferred coordinates is set to the value of the X coordinate of the Y-axis intersecting the right border of the detected control item, with allowance for a gap space. The gap space is chosen for aesthetic purposes and can be any value equal to or greater than 0 inches. The preferred program uses a gap space of approximately 0.25 inches.

In step 302, the X coordinate of the preferred coordinates is set to the value of the X coordinate of the Y-axis intersecting the left margin of the computer form, with allowance for a gap space.

Once the X coordinate of the preferred coordinates is identified, processing continues in step 303 to identify the Y coordinate of the preferred coordinate. In step 303, a scan above the X coordinate, on the Y-axis intersecting the X coordinate is executed to identify a boundary element. The boundary element can be either a previously-placed control item or the top margin of the computer form. If a previously-placed control item is detected, processing continues at step 306. If the top margin of the computer form is detected in step 303, then processing continues at step 304.

In step 306, the Y coordinate of the preferred coordinates is set to the value of the Y coordinate of the X-axis containing the bottom border of the detected control item, with allowance for a gap space.

In step 304, the Y coordinate of the preferred coordinates is set to the value of the Y coordinate of the X-axis containing the top margin of the computer form, with allowance for a gap space.

Upon identifying the preferred X-Y coordinate, the Bubble Left, Bubble Up algorithm is complete and processing continues with step 4 of FIG. 5.

Step 4: Determine the Size of the New Control Item

Figure 11:
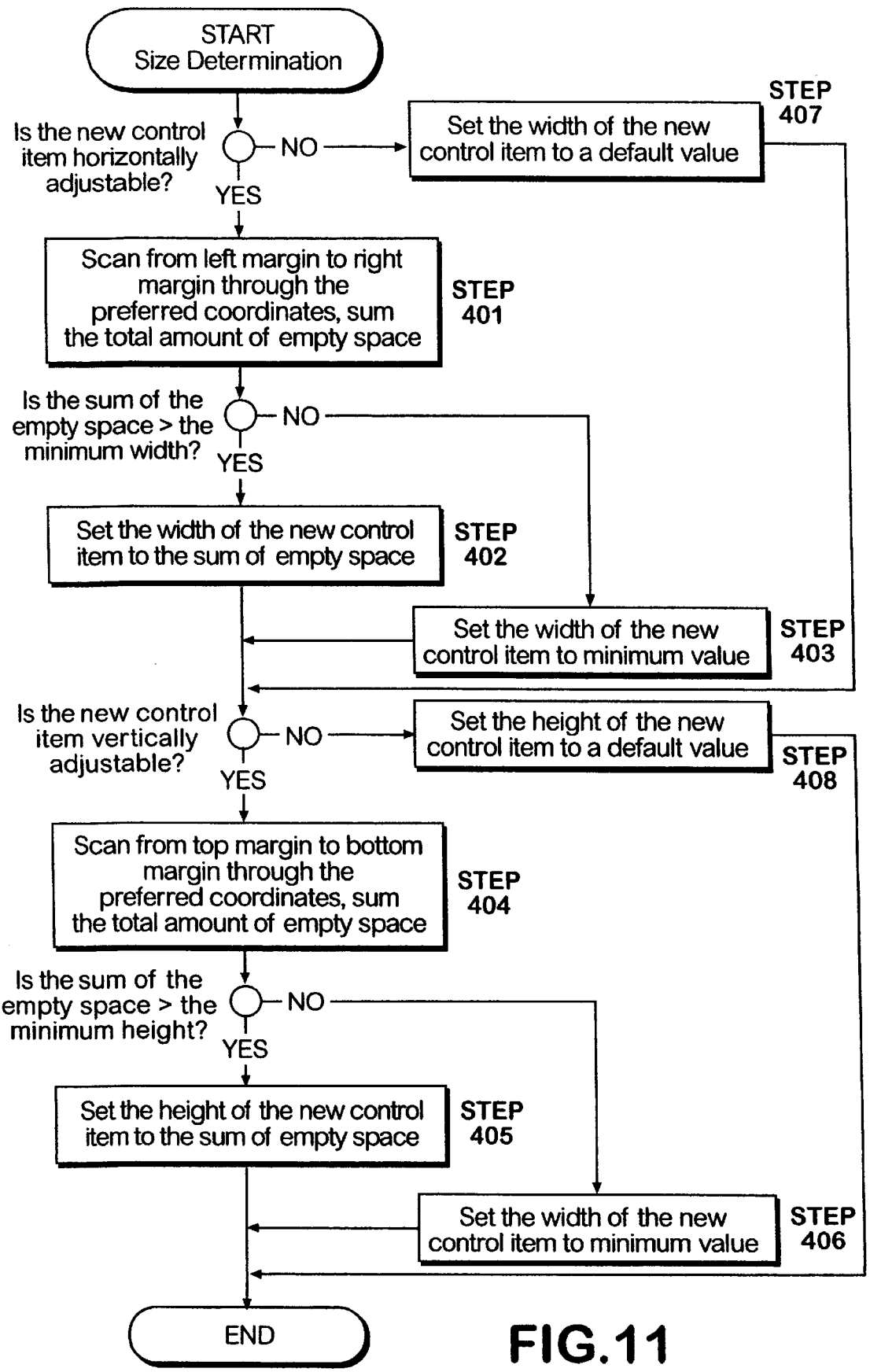
FIG. 11 is a flow chart diagram illustrating the steps of the Size Determination algorithm (step 4 of FIG. 5).

FIG. 11 is a flow chart diagram illustrating the steps of the Size Determination algorithm. Once the preferred X-Y coordinates for the placement of the new control item has been identified, the dimensions of the new control item must be determined. The preferred program uses the algorithm illustrated in FIG. 11 to perform this process.

Depending on the type of control item selected from the "Chooser Menu" (shown in FIG. 7), the new control item may have different properties. The dimensional properties of the new control item may include horizontally adjustable, vertically adjustable, minimum width, minimum height, fixed width, or fixed height. Horizontally and vertically adjustable imply that the control item can vary in size depending on the space available and the user requirements.

If the new control item is not horizontally adjustable, then step 407 is entered. In step 407, the width of the new control item is set to a previously determined or default value.

If the new control item is horizontally adjustable, step 401 is entered. In step 401, a scan between the left and right margins of the computer form is performed to identify the total space available for the width of the new control item. The scan consists of summing the amount of unoccupied space along the X-axis intersecting with the preferred coordinate. If the total space available is greater than any minimum width requirement for the new control item, then the width of the new control item is equated to the total space available in step 402. If the total space available is less than the minimum width, then processing continues at step 403. In step 403, the width of the new control item is set to its minimum value.

If the new control item is not vertically adjustable, then step 408 is entered. In step 408, the height of the new control item is set to a previously determined or default value.

If the new control item is vertically adjustable, step 404 is entered. In step 404, a scan between the top and bottom margins of the computer form is performed to identify the total space available for the height of the new control item. The scan consists of summing the amount of unoccupied space along the Y-axis intersecting with the preferred coordinate. If the total space available is greater than any minimum height requirement for the new control item, then the height of the new control item is equated to the total space available in step 405. If the total space available is less than the minimum height, then processing continues at step 406. In step 406, the width of the new control item is set to its minimum value.

Upon determining the size of the new control item, processing continues with step 5 of FIG. 5.

Step 5: Place the New Control Item

Once the preferred coordinates and the size of the new control item have been determined, the new control item is placed. Step 5 accomplishes this by placing the new control item at the preferred coordinates. In the preferred program, this is accomplished by positioning the upper left-hand corner of a rectangle encompassing the new control item, over the preferred coordinates.

Upon placing the new control item at the preferred coordinates, processing continues with step 6 of FIG. 5.

Step 6: Perform Adjustments

Once the new control item has been placed, some adjustments of the new control item and/or the previously-placed control items may be required. Generally, if any portion of the new control item overlaps any portion of another control item, the overlapped control item must be moved or adjusted to accommodate the new control item.

Horizontal Adjustments Algorithm

Figure 12:
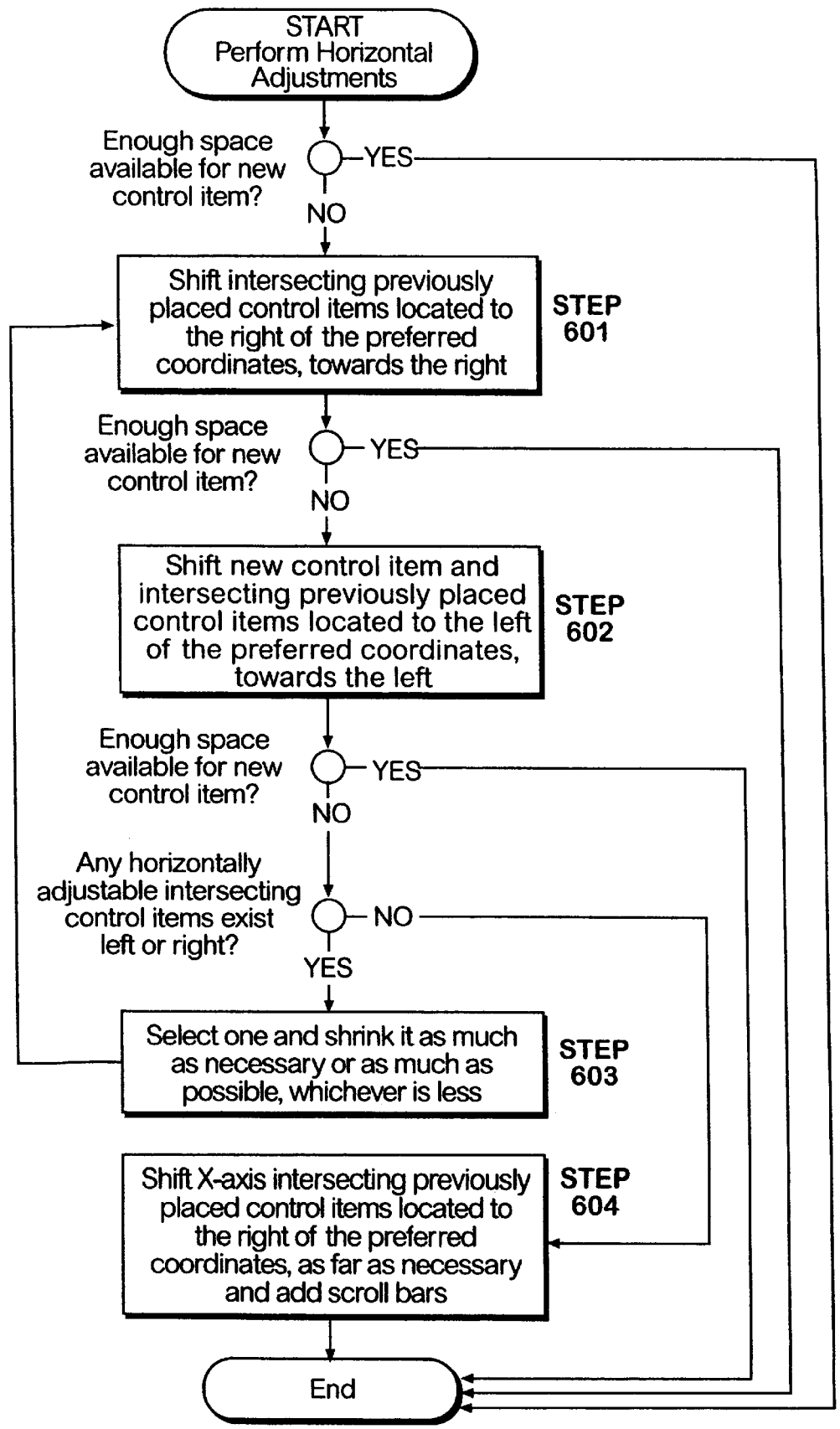
FIG. 12 is a flow chart diagram illustrating the steps of the Horizontal Adjustments algorithm (step 6 of FIG. 5).

FIG. 12 is a flow chart diagram illustrating the steps of the Horizontal Adjustments algorithm. If enough space is available for the new control item (i.e., the new control item does not overlap with existing control items) then the algorithm is exited without performing any adjustments. If additional space is required for the new control item, several types of adjustments may be required. In step 601, intersecting control items located on the right side of the new control item are shifted towards the right margin. This process results in reducing the gaps between the control items to a minimum value, allowing this space to be used for the new control item.

Figure 13A:
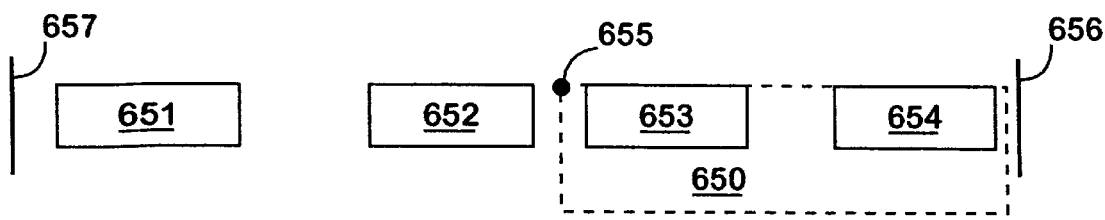
FIGS. 13a–e are diagrams illustrating the layout of several control items on a control form.
Figure 13B:
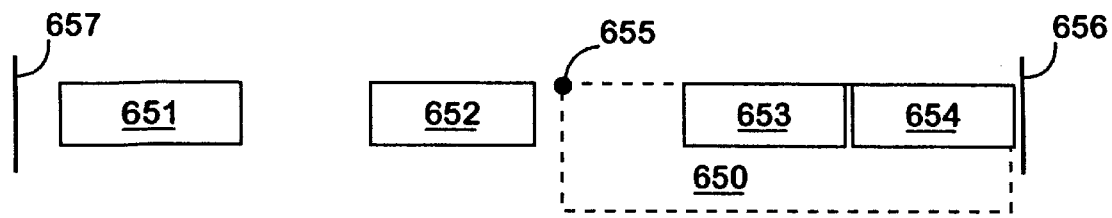

FIGS. 13*a–e* are diagrams illustrating the layout of several control items 650–654 of a control form. Each of the figures illustrate the various stages of the horizontal adjustment process. FIG. 13*a* illustrates the layout of the control items 650–654 after a new control item 650 has been placed at the preferred coordinates 655 prior to execution of step 601. The new control item 650 is shown as having preferred coordinates 655 which is positioned between two previously-placed control items 652, 653. The new control item 650 is shown as overlapping with two previously-placed control items 653, 654. FIG. 13*b* illustrates the layout of the control items 650–654 after the execution of step 601. The control items 653–654 located to the right of the preferred coordinates 655 of the new control item 650 have been shifted towards the right margin 656. The new control item 650 is shown as still overlapping with two previously-placed control items 653, 654.

After completion of step 601, if enough space is available for the new control item, the Horizontal Adjustments algorithm is exited without any further adjustments. If the new control item requires additional space (as in FIG. 13*b*), then step 602 is entered. In step 602, intersecting control items located on the left side of the preferred coordinates of the new control item are shifted towards the left margin. Additionally, the new control item is also shifted towards the left margin. This process results in reducing the gaps between the control items to a minimum value, allowing the space to be used for the new control item.

Figure 13C:
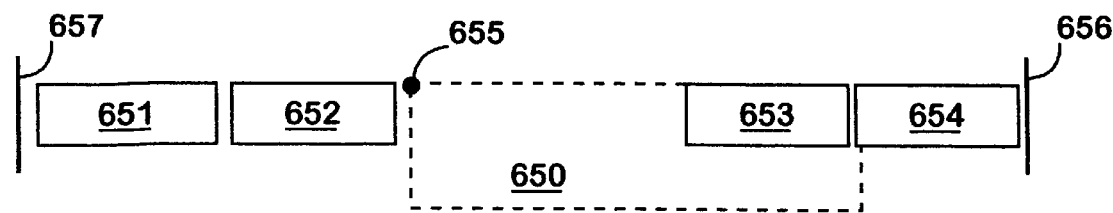

FIG. 13*c* illustrates the layout of the control items 650–654 after execution of step 602. The control items 651, 652 located on the left side of the preferred coordinates 655 of the new control item 650, as well as the new control item 650, have been shifted towards the left margin 657. The new control item 650 is shown as overlapping with control item 653.

After completion of step 602, if enough space is available for the new control item, the Horizontal Adjustments algorithm is exited without any further adjustments. If the new control item requires additional space (as in FIG. 13*c*), then the control items that intersect with the new control item are examined to identify if any of them are horizontally adjustable. If a horizontally adjustable control item is found, then step 603 is entered. In step 603, one of the horizontally adjustable control items is selected and the width is reduced. The adjustable control item is reduced as much as necessary (limited to a minimum value) in order to accommodate the new control item. After reducing the width of the adjustable control item, steps 601 and 602 are executed again to utilize any gaps that the reducing step 603 may have created. If the new control item still requires additional space, the loop of steps 603, 601, and 602 is repeated. This process will continue until either enough space is created for the new control item or all of the adjustable control items are reduced to their minimum values. An alternative approach to this process would be to count the number of adjustable control items which intersect with the new control item and then reduce them all an equal amount in order to accommodate the new control item. Another alternative approach would be to reduce the width of the new control item if it is horizontally adjustable. The process of reducing the control items could be limited to only reducing the width of the new control item, or could include either of the two previously described methods.

Figure 13D:
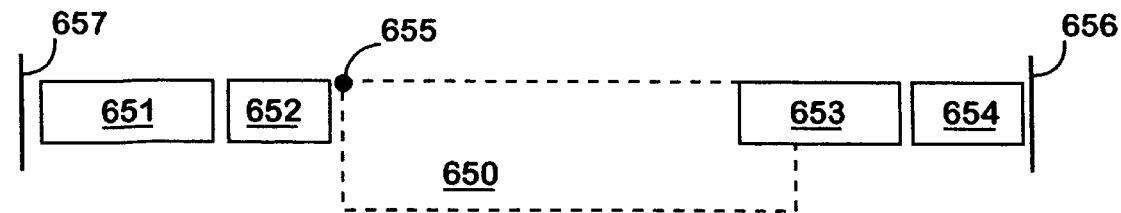

FIG. 13*d* illustrates the layout of the control items 650–654 after execution of step 603. Two of the control items 652, 654 are horizontally adjustable and have been reduced to their minimum sizes. The new control item 650 is shown as still overlapping with one previously-placed control item 653.

After each of the horizontally adjustable control items have been reduced, if the new control item still requires additional space (as in FIG. 13*d*), then step 604 is entered. In step 604, intersecting control items located to the right of the new control item are shifted to the right as much as necessary to accommodate the new control item. When the control items extend beyond the right margin of the form, horizontal scroll bar is added to the bottom of the form.

Figure 13E:
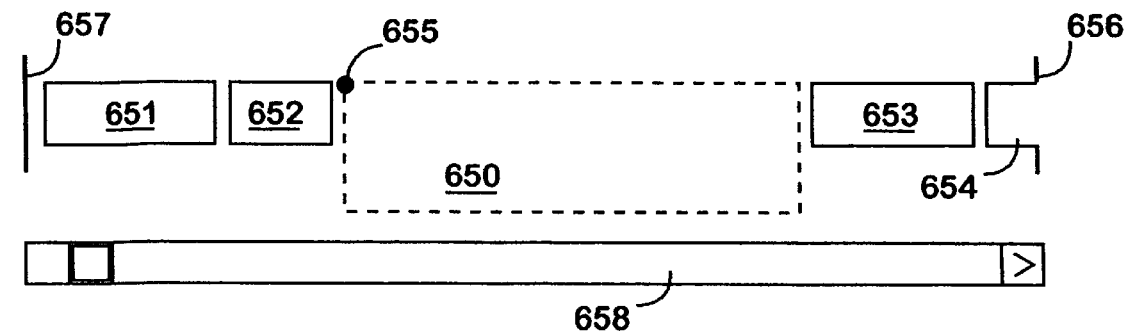

FIG. 13*e* illustrates a computer form with horizontal scroll bar 658 after the completion of step 604. Adequate space to accommodate the new control item 650 has been created, and scroll bar 658 indicates that a control item 654 is located to the right of the right margin 656.

Vertical Adjustments Algorithm

Figure 14:
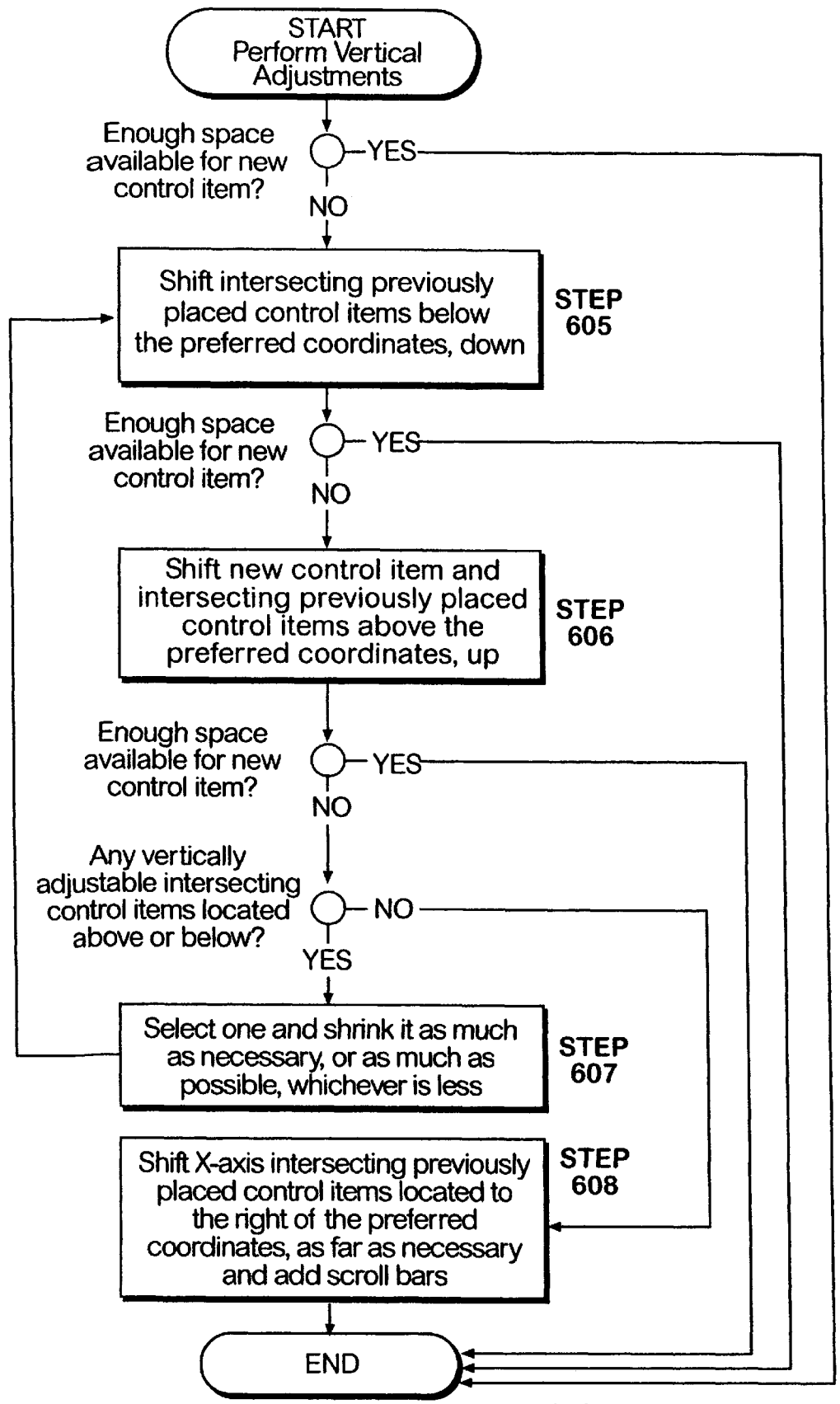
FIG. 14 is a flow chart diagram illustrating the steps of the Vertical Adjustments algorithm (step 6 of FIG. 5).

After completion of step 604, the Horizontal Adjustments algorithm is completed. At this point, the Vertical Adjustments algorithm is entered. FIG. 14 is a flow chart diagram illustrating the steps of the Vertical Adjustments algorithm. If enough space is available for the new control item (i.e., the new control item does not overlap with existing control items), then the algorithm is exited without performing any vertical adjustments. If additional space is required for the new control item, several types of adjustments may be required. In step 605, intersecting control items located below the new control item are shifted down towards the bottom margin. This process results in reducing the gaps between the control items to a minimum value, allowing this space to be used for the new control item. If additional space is required, then step 606 is entered. If enough space is available for the new control item, then the Vertical Adjustments algorithm is exited.

In step 606, intersecting control items located above the new control item are shifted up towards the top margin. Additionally, the new control item is also shifted towards the top margin. This process results in reducing the gaps between the control items to a minimum value, allowing the space to be used for the new control item. If enough space is available for the new control item, then the Vertical Adjustments algorithm is exited. If additional space is required, then the control items that intersect with the new control item are examined to identify if any of them are vertically adjustable. If a vertically adjustable control item is found, then step 603 is entered.

In step 603, one of the vertically adjustable control items is selected, and its height is reduced. The adjustable control item is reduced as much as necessary to accommodate the new control item to a minimum value. After reducing the height of the adjustable control item, steps 605 and 606 are executed again to utilize any gaps that the reducing step 607 may have created. If the new control item still requires additional space, the loop of steps 607, 605, and 606 is repeated. This process will continue until either enough space is created for the new control item or all of the adjustable control items are reduced to their minimum values.

Alternative approaches to the adjustments step are also contemplated. One embodiment would exclude steps 602 and 606. This embodiment could ensure that new control items are positioned in a manner to ensure that gaps will not exist above or to the left of the new control item. In this embodiment, adjustable control items located above or to the left of the new control item would not be reduced.

In another embodiment, steps 602 and 606 could be excluded unless an adjustable control item, either above or to the left of the new control item, has been reduced. In this case, the shift left process of step 602 or the shift up process of step 606 would be necessary.

In another embodiment, steps 604 and 608 could be eliminated. In this embodiment, the use of a scroll bar would not be necessary. In the case where there is not enough room to accommodate the new control item, the user would be required to manually adjust or delete surrounding control items in order to accommodate the new control item.

Upon completion of any required adjustments to accommodate the new control item, processing continues with step 7 of FIG. 5.

Step 7: Identify and Assign Alignment Properties

The final step in the preferred program is to identify and assign any alignment properties to the new control item. The preferred program implements two types of alignment properties: (1) right alignment and (2) bottom alignment. If a control item possesses the right alignment property, then the position of the control item is dependent upon the intersecting control items located to the left of the right-aligned control item. Thus, if the width of a control item located to the left of a right-aligned control item is reduced, then the right-aligned control item will shift to the left to maintain the same gap space. Likewise, if a left located control is moved either left or right, then the right-aligned control item will move in the same amount and in the same direction. Thus, a right-aligned control item will attempt to maintain the current alignment or spacing with the right border of intersecting control items located to the left of the right-aligned control item.

Figure 15:
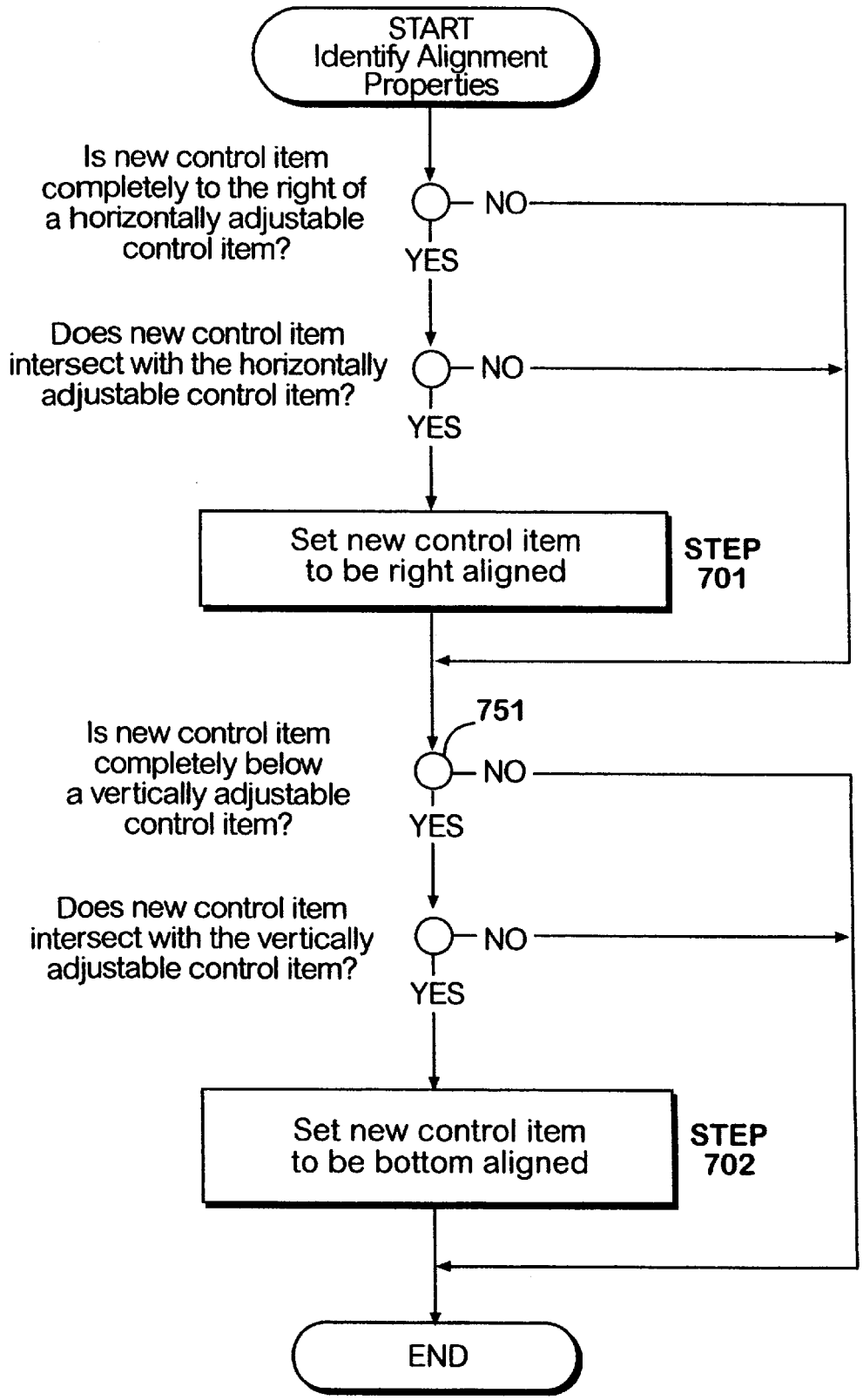
FIG. 15 is a flow chart diagram illustrating the steps of the Assign Alignment Properties algorithm (step 7 of FIG. 5).

FIG. 15 is a flow chart diagram illustrating the steps of the Assign Alignment Properties algorithm. A new control item is considered to be completely to the right of another control item if every portion of the new control item is located to the right of the right border of the other control item. If the new control item is completely to the right of a horizontally adjustable control item and intersects with the same, then step 701 is entered. In step 701, the right alignment property is assigned to the new control item. If the new control item is not completely to the right of horizontally adjustable control item or does not intersect with the same, then processing continues at point 751.

A new control item is considered to be completely below another control item if every portion of the new control item is located below the bottom border of the other control item. If the new control item is completely below a vertically adjustable control item and intersects with the same, then step 702 is entered. In step 702, the bottom alignment property is assigned to the new control item. If the new control item is not completely below a horizontally adjustable control item or does not intersect with the same, the Assign Alignment Properties algorithm is exited.

Figure 16A:
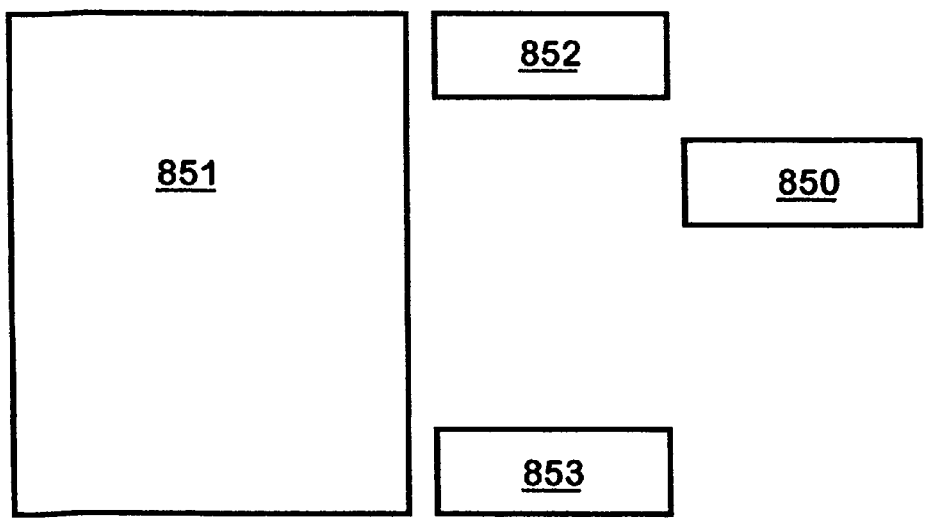
FIGS. 16a–b are diagrams illustrating a special case of alignment properties.
Figure 16B:
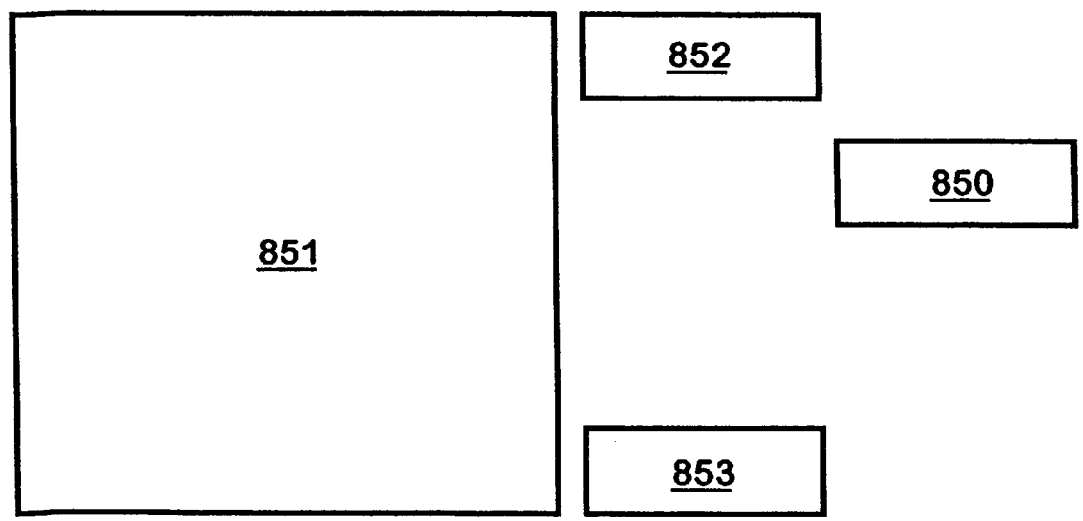

FIGS. 16*a*–*b* are diagrams illustrating a special case of the alignment properties. FIG. 16*a* illustrates the conditions under which this special case arises. This case occurs when a right-aligned control item 850 is located between and to the right of two other right-aligned control items 852, 853. In this scenario, if a control item 851 located to the left of the right-aligned control items 852, 853 is expanded, then the right-aligned control items 852, 853 are shifted to the right. Under normal conditions, the right-aligned control item 850 would not be affected by the shifted right-aligned control items 852, 853 because it does not intersect with the shifted, right control items 852, 853. In this special case, however, because the right-aligned control item is located between two shifted control items, it is also shifted as the control item 851 expands. FIG. 16*b* is a diagram illustrating the placement of the control items after control item 851 expands.

Similar to the right alignment property, if a control item is bottom-aligned, it will maintain relative position with the bottom border of intersecting control items located above the control item.

Upon completion of the Assign Alignments algorithm, the process of automatically placing a new control item has been completed. For each additional new control item these steps are repeated.

Automatic Repositioning on Re-size and Override Capability

The preferred program includes an Automatic Control Repositioning on Re-size algorithm. Automatic Control Repositioning allows users to easily alter forms after the control items have been initially positioned. If a control item is re-sized in an edited computer form, other related control items may be affected. This algorithm is used to determine if other controls should be adjusted when a control item is re-sized, and then automatically repositions those control items.

Figure 17:
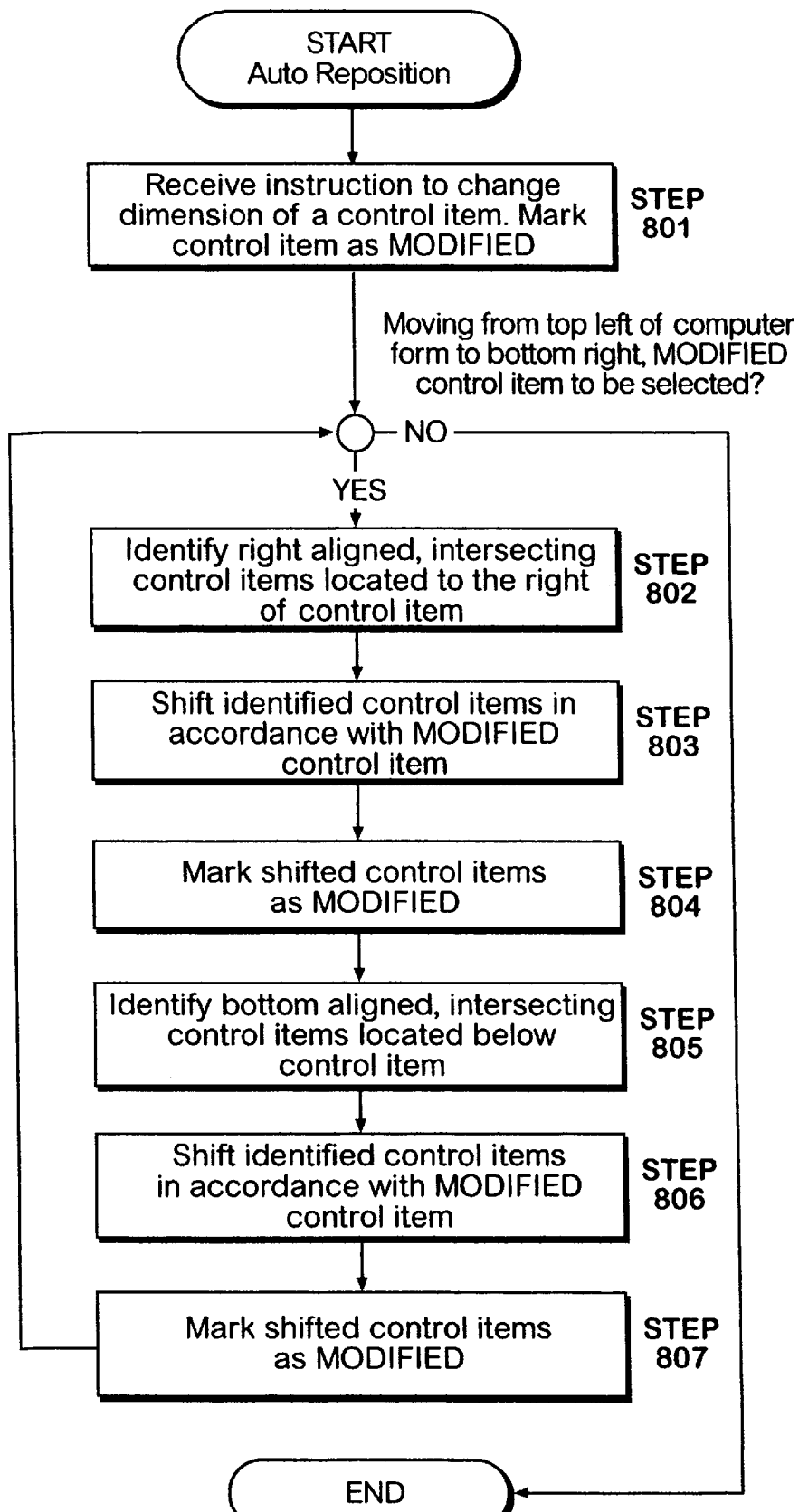
FIG. 17 is a flow chart diagram illustrating the steps of the Automatic Control Repositioning on Re-size algorithm.

FIG. 17 is a flow chart diagram illustrating the steps of the Automatic Control Repositioning on Re-size algorithm. Generally, this algorithm operates on the control items based on their alignment properties. In step 801, instructions are received which indicate that the dimensions of a control item have been changed. The control item may have changed in the X dimension, the Y dimension, or both. The general flow of this algorithm is to identify control items that are affected by the re-sizing of a control item, and then adjust them accordingly. In addition, the adjusted control items may also affect other control items. Therefore, the process of adjusting the control items is a recursive process.

In the preferred embodiment, right alignment and bottom alignment are the only two alignment properties utilized; however, other embodiments utilizing left alignment and top alignment are also anticipated. By only utilizing the right and bottom alignment properties, if a control item is modified, it will only have an affect on control items below or to the right of the modified control item. Therefore, the Automatic Control Repositioning on Re-size algorithm begins with the modified control item identified in step 801 and moves towards the bottom right-hand side of the computer form.

Steps 802–804 process changes in the X dimension and steps 805–807 process changes in the Y dimension. Step 802 is entered if additional control items must be processed. In step 802, intersecting control items located to the right of the modified control item are examined to identify which ones are right-aligned. In step 803, the right-aligned, intersecting control items are shifted in the X dimension the same amount and in the same direction as the change in the modified control item. In step 804, the shifted control items are then marked as "modified" for later processing. The process of marking a control item as "modified" could be implemented in several ways including a assigning a Boolean property field or adding the shifted control item to a list of modified control items to be processed.

In step 805, intersecting control items located below the modified control item are examined to identify which ones are bottom-aligned. In step 806, the bottom-aligned, intersecting control items are shifted in the Y dimension the same amount and in the same direction as the change in the modified control item. In step 807, the shifted control items are then marked as modified for later processing.

In the preferred program the Automatic Reposition on Re-size algorithm is initially invoked when the size of a control item is modified. It is also conceived and anticipated that this algorithm is applicable when a control item has been moved or repositioned.

The preferred program also includes an Override Capability. The Override Capability allows the automatic adjustments to be disabled after the initial placement of a control item. Thus, when a new control item is dropped onto a form and automatically placed at a preferred coordinate, the user can subsequently move the control item to another alternate location. Because the automatic adjustment is only applicable for the initial placement, the moved control item will remain at the alternate location. The automatic positioning processes (i.e., Bubble Left, Bubble Up) would not be invoked to adjust the position of the moved control item. This feature of the preferred program has several exceptions:

(1) If a new control item is placed on the form, previously-placed control items may be automatically moved and adjusted in order to accommodate the new control item. Thus, the Override Capability does not prevent previously-placed control items from being adjusted when a new control item is added.

(2) If an adjustable control item either increases or decreases in size, previously-placed right or bottom-aligned control items may be adjusted. Thus, the Override Capability does not circumvent the Automatic Reposition on Re-size capability.

(3) If a control item is moved to a new location, neighboring control items may require bottom and right alignment adjustments. Thus, the Override Capability does not prevent previously-placed control items from being adjusted when a control item is moved.

Automatic Association and Alignment

The preferred program further simplifies the process of creating forms by allowing a user to drag and drop an automatically labeled control item onto a form. When this occurs, a label is automatically created and centered relative to an associated control item. In previous form design solutions, users were required to drag a control to the computer form and attach an appropriate label. The user was required to carefully align the label and the control item, and then link the label and control item together so that they will be treated as single a unit. Thus, previous form design solutions required the user to perform the functions of:

placing a new control item onto the form;

placing a new label onto the form;

aligning the label and control item; and linking the label and control item.

By automatically defining the control item and the label as a single unit, the preferred program simplifies this process.

The preferred program also aligns the labels with their associated control items. The alignment function is accomplished by dividing the form into vertical partitions by the use of alignment bars. When a label/control item pair is placed on the form, the alignment bars are used to align the labels and control items in an aesthetically pleasing manner.

Figure 18:
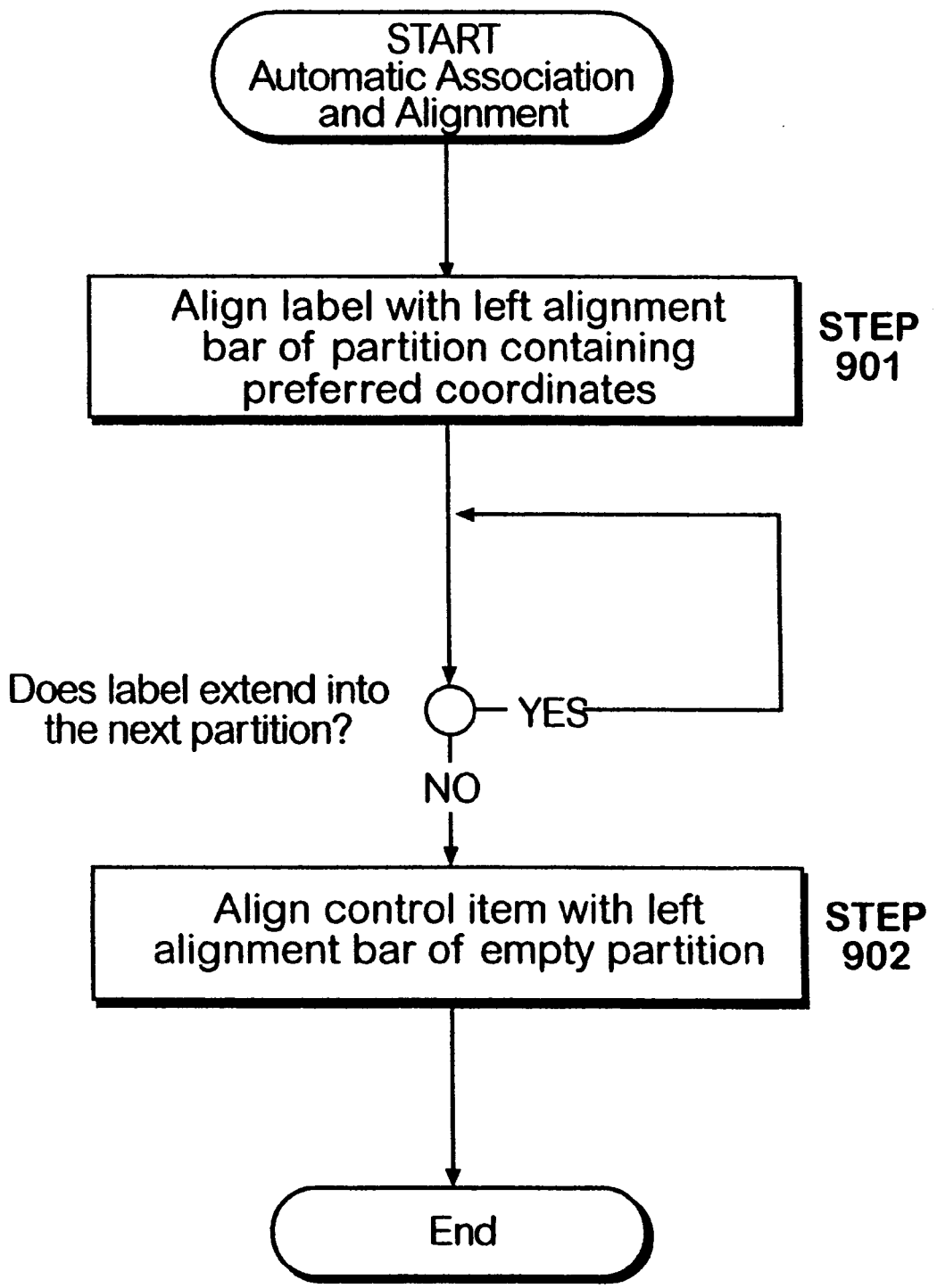
FIG. 18 is a flow diagram illustrating the steps of the Automatic Association and Alignment algorithm.
Figure 19:
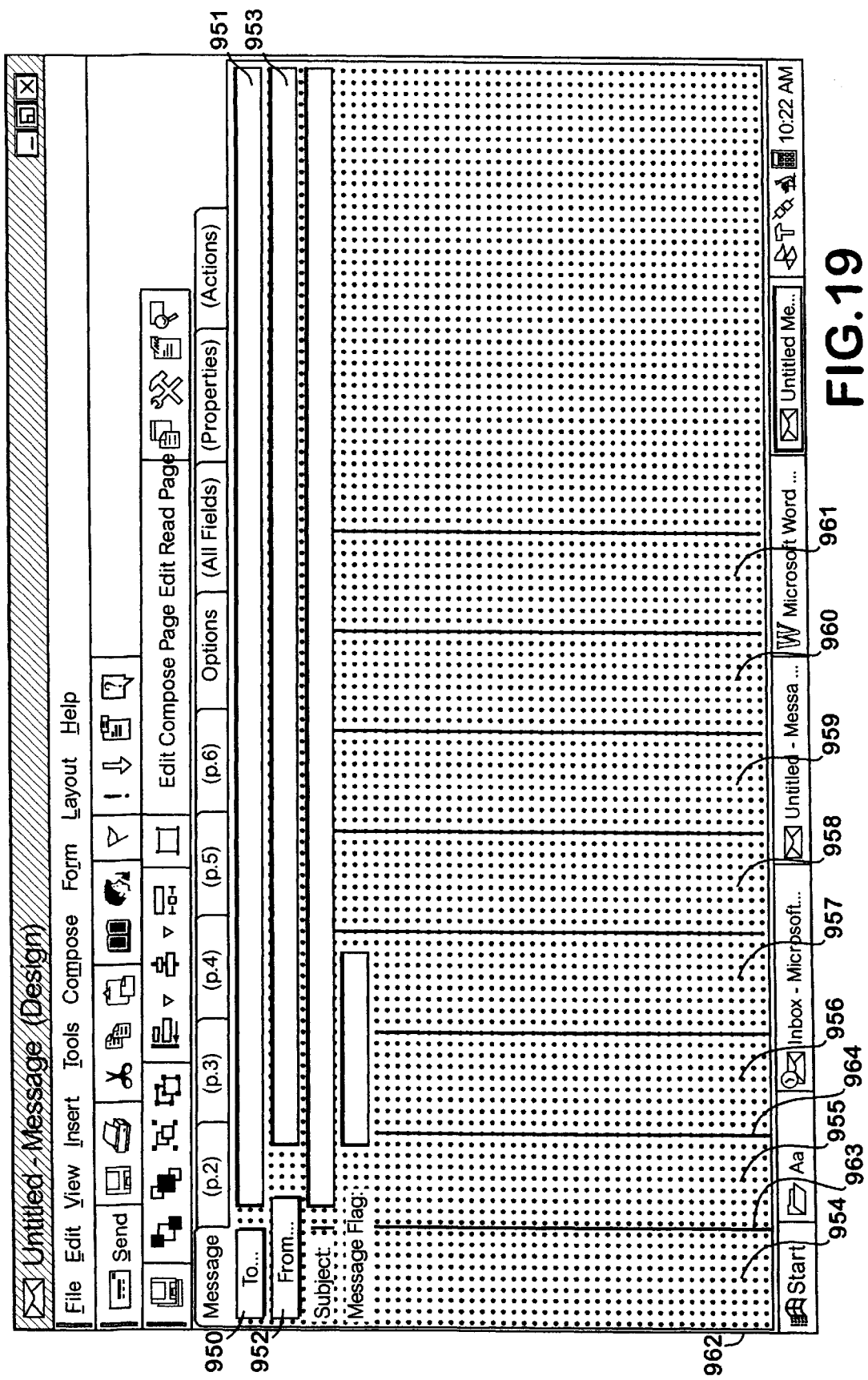
FIG. 19 is a diagram illustrating a display screen of a control form overlaid with alignment bars.

FIG. 18 is a flow diagram illustrating the steps of the Automatic Association and Alignment algorithm. FIG. 19 is a diagram illustrating a display screen of a control form overlaid with alignment bars. The alignment bars are not actually visible on a computer form but have been drawn on FIG. 19 for illustrative purposes. Each vertical partition 954–961 is bordered by two alignment bars. For instance, vertical partition 954 is bordered by two alignment bars 962, 963.

In step 901 of FIG. 18, the label of a label/control item pair is aligned with the left alignment bar of the vertical partition containing the preferred coordinates. In step 902, the control item of the label/control item pair is aligned with the left alignment bar of the first partition to the right of the label and which is unoccupied by any portion of the label. FIG. 19, illustrates several label/control item pairs. The preferred coordinates of the "To" label 950 are within vertical partition 954, and is thus aligned with the left alignment bar 962 of partition 954. Because the "To" label 950 is completely contained within a single partition 954, the control item 951 associated with the "To" label 950 is aligned on the left alignment bar 963 of partition 955. In contrast, the preferred coordinates of the "From" label 952 are within vertical partition 954; however, the width of the "From" label 952 spans over two partitions 954, 955. Thus, the control item 953 associated with the "From" label 952 is aligned on left alignment bar 964 of the first partition 956 which does not contain any portion of the "From" label 952.

From the foregoing description, it will be appreciated that the present invention provides a system to improve the efficiency of creating computer forms by providing the ability for automatically performing predictable operations associated with the process. Although the present invention has been described as embodied in a information management application, it will be appreciated that the present invention can be utilized in any type of application utilizing computer forms. Indeed, the present invention is not limited to any particular application.

The present invention may be conveniently implemented in one or more program modules. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers and program modules that can be used to practice the instant invention, it is not practical to provide a representative example of a computer program that would be applicable to these many different systems. Each user of a particular computer would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers regardless of the application.

Alternative embodiments will become apparent to those skilled in the art to which the present invention pertains without departing from its spirit and scope. Accordingly, the scope of the present invention is described by the appended claims and supported by the foregoing description.

We claim:

1. A method for automatically positioning a new control item of a computer form, comprising the steps of:
   selecting said new control item from a list of control items, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item;
   designating a drop-point on said computer form;
   determining the preferred coordinates, relative to said drop-point, for positioning said new control item;
   positioning said new control item at said preferred coordinates; and adjusting said new control item, such that a spatial organization of control items in said computer form can be altered for a desired application.

2. The method of claim 1, wherein said computer form can be represented by a plurality of X axes and a plurality of Y axes orthogonal to the X axes, and said step of determining said preferred coordinates further comprises the step of identifying an X coordinate and a Y coordinate.

3. The method of claim 2, wherein said drop-point has an X coordinate and a Y coordinate, and said identifying step further comprises the steps of:
   detecting a first boundary element in a first direction on an X axis corresponding with said Y coordinate of said drop-point;
   setting said X coordinate of said preferred coordinates relative to said first boundary element;
   detecting a second boundary element in a second direction on a Y axis corresponding with said X coordinate of said preferred coordinates; and
   setting said Y coordinate of said preferred coordinates relative to said second boundary element.

4. The method of claim 3, wherein said first boundary element is a previously-placed control item, and said step of setting said X coordinate of said preferred coordinates further comprises the step of equating said X coordinate of said preferred coordinates to the value of an X coordinate which corresponds with the border of said previously place control item that is nearest to said drop-point with allowance for a gap space which is greater than or equal to 0 inches.

5. The method of claim 3, wherein said second boundary element is a previously-placed control item, and said step of setting said Y coordinate of said preferred coordinates further comprises the step of equating said Y coordinate of said preferred coordinates to the value of a Y coordinate which corresponds with the border of said previously place control item that is nearest to said drop-point with allowance for a gap space which is greater than or equal to 0 inches.

6. The method of claim 3, wherein said first boundary element is a margin of said computer form, and said step of setting said X coordinate of said preferred coordinates further comprises the step of equating said X coordinate to the value of an X coordinate which corresponds with said margin with allowance for a gap space.

7. The method of claim 3, wherein said second boundary element is a margin of said computer form, and said step of setting said Y coordinate of said preferred coordinates further comprises the step of equating said Y coordinate to the value of a Y coordinate which corresponds with said margin with allowance for a gap space.

8. The method of claim 1, wherein said adjusting said new control item step further comprises the step of setting the width of said new control item.

9. The method of claim 8, wherein said computer form can be represented by a plurality of orthogonal X and Y axes, and said step of setting the width of said new control item further comprises the steps of:
   if said control item is X-axis-adjustable:
      identifying the total space available between the left and right margins of said computer form along the X axes containing said new control item,
      setting the width of said new control item based on the total space available;
      if the total space is less a minimum width, setting the width of said control item to a minimum width; and
   if said new control item is not X-axis-adjustable, setting the width of said new control item to a predetermined value.

10. The method of claim 1, wherein said adjusting said new control item step further comprises the step of setting the height of said new control item.

11. The method of claim 10, wherein the computer form can be represented by a plurality of orthogonal X and Y axes, and said step of setting the height of said new control item further comprises the steps of:
    if the control item is Y-axis-adjustable:
       identifying the total space available between the top and bottom margins of said computer form along the Y axes containing said new control item,
       setting the height of said new control item based on the total space available;
       if said total space is less than a minimal height, setting the height of said new control item to a minimum height; and
    if said new control item is not Y-axis-adjustable, setting the height of said new control item to a predetermined value.

12. The method of claim 1, further comprising the step of adjusting intersecting control items to accommodate said new control item.

13. The method of claim 12, wherein said adjusting intersecting control items step, further comprises the steps of:
    identifying the space available to the right of said preferred coordinates; and
    if said width of said new control item exceeds the space available, obtaining additional space for said new control item.

14. The method of claim 13, wherein said computer form can be represented by a plurality of orthogonal X and Y axes, and said step of obtaining additional space comprises the step of shifting each X-axis-intersecting control item, towards the margin of said computer form located on the same side of said new control item as said X-axis-intersecting control item.

15. The method of claim 13, wherein said computer form can be represented by a plurality of orthogonal X and Y axes, and said step of obtaining additional space comprises the steps of:
    if any X-axis-adjustable control items intersect with said new control item on the X axis, reducing the width of at least one of said X-axis-adjustable control items;
    reducing the width of said new control item; and
    shifting each X-axis-intersecting control item, towards the margin of said computer form located on the same side of said new control item as said X-axis-intersecting control item.

16. The method of claim 12, wherein the computer form can be represented by a plurality of orthogonal X and Y axes, and said step of obtaining additional space comprises the step of shifting each Y-axis-intersecting control item, towards the margin of said computer form located on the same side of said new control item as said Y-axis-intersecting control item.

17. The method of claim 12, wherein said computer form can be represented by a plurality of orthogonal X and Y axes, and said step of obtaining additional space comprises the steps of:
if any Y-axis-adjustable control items intersect with said new control item on the Y axis, reducing the height of at least one of said Y-axis-adjustable control items;
reducing the height of said new control item; and
shifting each Y-axis-intersecting control item, towards the margin of said computer form located on the same side of said new control item as said Y-axis-intersecting control item.

18. The method of claim 1, further comprising the steps of:
setting said new control item to be right-aligned if said new control item is located completely to the right of an X-axis-adjustable control item, and intersects with said X-axis-adjustable control item;
setting said new control item to be right-aligned if said new control item is located completely to the right of a right-aligned control item and intersects with said right-aligned control item;
setting said new control item to be bottom-aligned if said new control item is completely below a Y-axis-adjustable control item, and intersects with said Y-axis-adjustable control item; and
setting said new control item to be bottom-aligned if said new control item is completely below a bottom-aligned control item and intersects with said bottom-aligned control item.

19. A computer-readable medium on which is stored a computer program for automatically positioning new control items, said computer program comprising instructions which, when executed by said computer, perform the steps of:
selecting one of the new control items from a list of control items in response to a first command, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item;
moving said new control item to a drop-point in response to a second command;
identifying an insertion-point for said new control item which has been dropped at said drop-point on said computer form;
determining preferred coordinates, relative to said insertion-point, for positioning said new control item;
positioning said new control item at said preferred coordinates; and adjusting said new control item, such that a spatial organization of control items in said computer form can be altered for a desired application.

20. The computer-readable medium recited in claim 19, wherein said computer form can be represented by a plurality of orthogonal X and Y axes with each control item being located at an X-Y coordinate, and said identifying step further comprises the steps of:
a. sorting previously-placed control items on the computer form by the Y coordinate and then by the X coordinate to create a sorted order;
b. selecting a first control item in accordance with said sorted order; and
c. determining if said drop-point is most proximate to said first control item;
d. if said drop-point is most proximate to said first control item, equating said insertion-point in relation to said first control item; and
e. if said drop-point is not within the vicinity of said first control item, selecting a next control item in accordance with said sorted order and repeating steps c–e with said next control item.

21. The computer-readable medium recited in claim 20, wherein said determining step further comprises the steps of:
identifying the dimensions of a left-side gap of said first control item;
determining said drop-point is most proximate to said first control item when said drop-point is within the dimensions of said left-side gap of said first control item;
determining said drop-point is most proximate to said first control item when said drop-point is within the dimensions of the left half of said first control item;
determining said drop-point is most proximate to said first control item when said drop-point is located above and within the X dimension of said first control item;
determining said drop-point is most proximate to said first control item when said drop-point is located above and within the X dimension of said left-side gap of said first control item; and
if said first control item is located at the end of a line:
identifying the dimensions of a right-side gap of said first control item;
determining said drop-point is most proximate to said first control item when said drop-point is located within the dimensions of said right-side gap of said first control item; and
determining said drop-point is most proximate to said first control item when said drop-point is located above and within the X dimension of said right-side gap of said first control item.

22. The computer-readable medium recited in claim 20, wherein said first control item has a left-side gap and a left half, and said step of equating said insertion-point in relation to said first control item, further comprises the steps of:
equating said insertion-point to the current line if said drop-point is within the dimensions of said left-side gap of said first control item;
equating said insertion-point to the current line if said drop-point is within the dimensions of said left half of said first control item;
equating said insertion-point to the previous line if said drop-point is above and within the X dimensions of said left-side gap of said first control item; and
equating said insertion-point to the previous line if said drop-point is above and within the X dimensions of said first control item.

23. The computer-readable medium recited in claim 20, wherein said first control item is located at the end of a line and has a right-side gap, and said step of equating said insertion-point in relation to said first control item, further comprises the steps of:

equating said insertion-point to the current line if said drop-point is within the dimensions of said right-side gap of said first control item; and equating said insertion-point to the previous line if said drop-point is above and within the X dimensions of said right-side gap of said first control item.

24. The computer-readable medium recited in claim 19, wherein the computer form can be represented by a plurality of orthogonal X and Y axes, and said step of determining preferred coordinates, further comprises the steps of:

detecting a first boundary element to the left of said insertion-point;

setting the X coordinate of said preferred coordinates relative to said first boundary element;

detecting a second boundary element above the X coordinate of said preferred coordinates; and setting the Y coordinate of said preferred coordinates relative to said second boundary element.

25. The computer-readable medium recited in claim 19, wherein said adjusting said new control item step comprises the step of equating the width of said new control item to the amount of space available on the line containing said preferred coordinates.

26. The computer-readable medium recited in claim 19, wherein said adjusting said new control item step comprises the step of equating the height of said new control item to the amount of space available on the Y-axis containing said preferred coordinates.

27. The computer-readable medium recited in claim 19, further comprising the step of adjusting intersecting control items to accommodate said new control item at said preferred coordinates.

28. The computer-readable medium recited in claim 27, wherein said new control item is X-axis-adjustable and said adjusting intersecting control items step further comprises the steps of:

a. identifying the space available between said preferred coordinates and a first boundary element to the right of said preferred coordinates; and b. if the width of said new control item is greater than the identified space available:

shifting control items located to the right of said preferred coordinates and intersecting with said new control item, towards the right margin, shifting said new control item and control items located to the left of said preferred coordinates and intersecting with said new control item, towards the left margin, and if an X-axis-adjustable control item intersects with said new control item on the X axis, compressing said adjustable previously-placed control item and repeating step b.

29. The computer-readable medium recited in claim 27, wherein said new control item is Y-axis-adjustable and said adjusting intersecting control items step further comprises the steps of:

a. identifying the space available between said preferred coordinates and a first boundary element below said preferred coordinates; and b. if the height of said new control item is greater than the identified space available:

shifting control items located below said preferred coordinates and intersecting with said new control item, towards the bottom margin, shifting said new control item and control items located above said preferred coordinates and intersecting with said new control item, towards the top margin, and if a Y-axis-adjustable control item intersects with said new control item on the Y axis, compressing said adjustable previously-placed control item and repeating step b.

30. A computer system for automating the process of creating computer forms by automatically positioning new control items, comprising:

a processing unit;

a memory storage device;

an input device coupled to said processing unit for receiving data;

a pixel-based display device coupled to said processing unit for displaying data;

a program module, stored in said memory storage device for providing instructions to said processing unit;

said processing unit, responsive to said instructions of said program module, operative to:

receive a select command to select a new control item from a plurality of control items, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item;

receive an insertion command to insert said new control item onto a computer form;

identify an insertion-point on said computer form for said new control item;

determine preferred coordinates comprising an X coordinate and Y coordinate, relative to said insertion-point, for positioning said new control item; and position said new control item at said preferred coordinates, such that a spatial organization of control items in said computer form can be altered for a desired application.

31. The computer system of claim 30, wherein said processing unit is operative to receive an insertion command to insert a new control item by:

displaying a selection list of control item types;

receiving a selection command selecting one of said control item types; and receiving an insertion command to place said new control item of said control item type at a drop-point, said drop-point being identified by a movable display element.

32. The computer system of claim 30, wherein said insertion command identifies a drop-point for said new control item and said processing unit is operative to identify an insertion-point for said new control item by:

identifying a most-proximate control item relative to said drop-point for said new control item, and assigning said insertion-point relative to said most proximate control item.

33. The computer system of claim 30, wherein said processing unit is operative to determine preferred coordinates comprising an X coordinate and Y coordinate, relative to said insertion-point by:

detecting a first boundary element to the left of said insertion-point;

setting said X coordinate of said preferred coordinates relative to said first boundary element;

detecting a second boundary element above said X coordinate of said preferred coordinates; and setting said Y coordinate of said preferred coordinates relative to said second boundary element.

34. The computer system of claim 30, wherein said new control item is adjustable, and prior to said positioning step, said processing unit is further operative to determine the dimensions of said new control item.

35. The computer system of claim 34, wherein said new control item is horizontally adjustable and said processing unit is operative to determine the dimensions of said new control item by:

summing the total space unoccupied by control items between the left and right margins of said computer form and intersecting with said new control item; and equating the width of said new control item to the summed total space.

36. The computer system of claim 34, wherein said new control item is vertically adjustable and said processing unit is operative to determine the dimensions of said new control item by:

summing the total space unoccupied by control items between the top and bottom margins of said computer form and intersecting with said new control item; and equating the height of said new control item to the summed total space.

37. The computer system of claim 30, wherein said processing unit is further operative to perform adjustments to control items about said new control item for accommodating said new control item at said preferred coordinates.

38. The computer system of claim 37, wherein said new control item has a width and a height, and said processing unit is operative to perform adjustments to control items about said new control item by:

a. identifying the space available on the X-axis between said preferred coordinates and the left most boundary of the first control item located to the right of said insertion-point and intersecting said new control item; and b. if the width of said new control item is greater than the amount of space available:

shifting control items located to the right of said insertion-point and intersecting said new control item, towards the right margin, shifting said new control item and control items located to the left of said new control item and intersecting said new control item, towards the left margin, and if a horizontally adjustable control item intersects with said new control item, compressing said horizontally control item and repeating step b.

39. The computer system of claim 37, wherein said new control item has a width and a height, and said processing unit is operative to perform adjustments to control items about said new control item by:

a. identifying the space available on the Y-axis between said preferred coordinates and the top most boundary of the first control item located below said insertion-point and intersecting said new control item; and b. if the height of said new control item is greater than the amount of space available:

shifting control items located below said insertion-point and intersecting said new control item, towards the bottom margin, shifting said new control item and previously-placed control items located above said new control item and intersecting new control item, towards the top margin, and if a vertically adjustable control item intersects with said new control item, compressing said vertically adjustable control item and repeating step b.

40. The computer system of claim 30, wherein said new control item is adjustable and said processing unit is further operative to perform adjustments to said new control item for accommodating said new control item at said preferred coordinates.

41. The computer system of claim 40, wherein said new control item is horizontally adjustable and said processing unit is further operative to perform adjustments to said new control item by reducing the width of said new control item up to and including a minimum width.

42. The computer system of claim 40, wherein said new control item is vertically adjustable and said processing unit is further operative to perform adjustments to said new control item by reducing the height of said new control item up to and including a minimum height.

43. A method for automatically adjusting the layout of a plurality of control items displayed on a computer form, to accommodate a modified control item on said computer form, comprising the steps of:

a. generating said modified control item by one of resizing and repositioning one of the control items on the computer form, each control item being one of plurality of control items selected from a list of control items, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item;

b. receiving new preferred coordinates for said modified control item;

c. determining the new dimensions of said modified control item; and d. adjusting any related control items to accommodate said modified control item, such that a spatial organization of control items in said computer form can be altered for a desired application.

44. The method of claim 43, wherein related control items include control items which intersect with said modified control item and said adjusting step further comprises the steps of:

shifting right-aligned related control items located to the right of said new preferred coordinates so that a gap equal to or greater than 0 inches is located between said right-aligned related control items and said modified control item; and shifting bottom-aligned related control items, located below said new preferred coordinates so that a gap equal to or greater than 0 inches is located between said bottom-aligned related control items and said modified control item.

45. The method of claim 43, wherein one or more related control items are adjusted and steps b–d are repeated for each of said related control items.

46. A computer-readable medium on which is stored a computer program for automatically adjusting the layout of a computer form, said computer program comprising instructions which, when executed by said computer, perform the steps of:

identifying individual control items from a list of control items, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item;

placing each individual control item on the computer form;

in response to receiving instructions to move a selected control item, identifying preferred coordinates to insert said selected control item;

in response to receiving instructions to alter the dimensions of said selected control item, identifying the new dimensions for said selected control item and identifying the current location as said preferred coordinates to insert said selected control item;

positioning said selected control item at said preferred coordinates; and adjusting related control items which are located about said preferred coordinates and intersect with said selected control item, in order to accommodate said selected control item, such that a spatial organization of control items in said computer form can be altered for a desired application.

47. The computer-readable medium of claim 46, wherein said step of adjusting previously-placed control items further comprises the steps of:

a. shifting all related control items located to the right of said preferred coordinates so that a predetermined gap is located to the right of said selected control item;

b. shifting said selected control item and all related control items located to the left of said preferred coordinates so that a predetermined gap is located to the left and to the right of said selected control item; and c. if related adjustable control items are located on either side of said selected control item:

selecting a related adjustable control item that has not been previously selected to accommodate said selected control item, and compressing the selected adjustable control item and then repeating steps a–c.

48. The computer-readable medium of claim 47, wherein one or more related control items are adjusted and steps a–c are repeated for of each said related control item.

49. A computer system for automating the process of adjusting the layout of a computer form containing a plurality of control items, said computer system comprising:

a processing unit;

a memory storage device;

an input device coupled to said processing unit for receiving data;

a pixel-based display device coupled to said processing unit for displaying data;

a program module, stored in said memory storage device for providing instructions to said processing unit;

said processing unit, responsive to said instructions of said program module, operative to:

placing a plurality of the control items selected from a list of control items on the computer form, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item;

a. receive an instruction to modify a control item which is located on said computer form;

b. if said instruction includes a request to move said control item, setting preferred coordinates to insert said control item in accordance with said instruction;

c. if said instruction includes a request to modify the dimensions of the control item, identify new dimensions for said control item; and d. perform necessary adjustments to accommodate said control item on said computer form, such that a spatial organization of control items in said computer form can be altered for a desired application.

50. A method to automatically create and associate label boxes with new control items which are placed onto a computer form, comprising the steps of:

in response to detecting a new control item being placed onto said computer form, creating a new label box, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item;

placing said label box onto said computer form;

aligning said label box with said new control item; and linking said label box to said new control item such that a spatial organization of control items in said computer form can be altered for a desired application.

51. The method of claim 50, wherein said aligning step further comprises the steps of:

a. positioning said label box to the left of said new control item; and b. centering said label box relative to said new control item.

52. A computer-readable medium on which is stored a computer program for automatically creating and associating labels with new control items which are placed onto a computer form, said computer program comprising instructions which, when executed by a computer, perform the steps of:

detecting a new control item being placed onto said computer form, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item;

creating a new label for said new control item;

placing said label onto the computer form; and associating said label with said new control item, such that a spatial organization of control items in said computer form can be altered for a desired application.

53. The computer-readable medium of claim 52, wherein said step of associating said label with said new control item further comprises the steps of:

aligning said label on the left side of said new control item;

centering said label box relative to said new control item; and linking said label to said new control item.

54. The computer-readable medium of claim 52, wherein said computer program further comprises instructions which, when executed by said computer, perform the steps of:

positioning said label and new control item at preferred coordinates; and adjusting previously-placed control items to accommodate said label and said new control item.

55. A computer system for automating the process of creating a computer form by automatically providing labels with new control items which have been inserted into a computer form, comprising:

a processing unit;

a memory storage device;

an input device coupled to said processing unit for receiving data;

a pixel-based display device coupled to said processing unit for displaying data;

a program module, stored in said memory storage device for providing instructions to said processing unit;

said processing unit, responsive to said instructions of said program module, operative to:

a. provide a plurality of auto-labeled control item types, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item;

b. receive a request to insert a new control item at a drop-point on said computer form, said new control item conforming to one of said auto-labeled control item types;

c. align a label with said new control item;

d. link said label with said new control item; and e. insert said label and said new control item onto said computer form, such that a spatial organization of control items in said computer form can be altered for a desired application.

56. The computer system of claim 55, wherein said processing unit operates to insert said label and said new control item by:

identifying preferred coordinates, relative to said drop-point;

positioning said label and said new control item at said preferred coordinates; and adjusting said label, said new control item, and related control items, to accommodate said label and said new control item at said preferred coordinates.

57. The computer system of claim 56, wherein said processing unit operates to identify preferred coordinates by:

determining if said drop-point has a most proximate control item;

if said drop-point has a most proximate control item, selecting said preferred coordinates relative to said most proximate control item; and if said drop-point does not have an associated control item, determining if said drop-point has an associated line-break, and if said drop-point has an associated line-break, selecting said preferred coordinates relative to said associated line-break.

58. The computer system of claim 57, wherein said computer form contains one or more place control items, each of said placed control items having an X-Y coordinate and a zone comprising a left-side gap, an upper gap, and the left half of said placed control item, and said processing unit operates to determine if said drop-point has a most proximate control item by:

examining each of said placed control items in an order based on the X-Y coordinates; and if said drop-point is located within said zone of an examined control item, identifying said examined control item as said most proximate control item.

59. The computer system of claim 57, wherein said most proximate control item is located on a current line, has a zone comprising a left-side gap, an upper gap located on a previous line, and the left half of said most proximate control item, and said processing unit operates to select said preferred coordinates relative to said associated previously-placed control item by:

if said drop-point is located within said upper gap, equating said preferred coordinates to a coordinate on said previous line, and shifted to the left of said drop-point as far as possible without crossing any boundaries which intersect with said previous line;

if said drop-point is located within said left-side gap, equating said preferred coordinates to a coordinate on said current line, and shifted to the left of said drop-point as far as possible without crossing any boundaries which intersect with said current line; and if said drop-point is located within the left half of said most proximate control item, equating said preferred coordinates to a coordinate on said current line, and shifted to the left of said drop-point as far as possible without crossing any boundaries other than the left boundary of said most proximate control item.

60. The computer system of claim 57, wherein the computer form contains one or more placed control items located at the right most end of a line, each of said placed control items having an X-Y coordinate, a right-side gap and a right-side upper gap, and said processing unit operates to determine if said drop-point has an associated line-break by:

examining each of said previously-placed control items in an order based on the X-Y coordinates;

if said drop-point is located within said right-side gap of an examined control item, identifying the line-break at the beginning of the next line as said associated line-break; and if said drop-point is located within said right-side upper gap of an examined control item, identifying the line-break at the beginning of the current line as said associated line-break.

61. The computer system of claim 57, wherein said processing unit operates to select said preferred coordinates relative to said associated line-break by equating said preferred coordinates to the point just before said associated line-break and inserting an additional line-break prior to said new label and said new control item.

62. The computer system of claim 56, wherein said processing unit operates to adjust said label, said new control item, and related control items by:

partitioning said computer form into a plurality of vertical partitions;

aligning the left side of said label at the left boundary of a vertical partition containing said insertion-point; and aligning said new control item at the left boundary of the first partition located completely to the right of said label.

63. The computer system of claim 56, wherein said processing unit operates to adjust said label, said new control item, and related control items by performing these steps in order until enough space to fit said label and said new control item is obtained:

a. decreasing the gaps of related control items located to the sides of said new control item to a minimum gap size;

b. if related adjustable control items are located to the sides of said new control item:

selecting one of said related adjustable control items that has not been selected previously to accommodate the new control item, compressing the selected adjustable control item up to a minimum width and repeating steps a–b.

64. A method to automatically place and align a control item and a label in relation to an insertion-point on a computer form, comprising the steps of:

partitioning said computer form into a plurality of vertical partitions;

aligning said label at the left boundary of the vertical partition containing said insertion-point; and aligning said control item at the left most edge of the next partition located to the right of said label and not covered by any portion of said label, each control item including a separate, self-contained field for simplifying and organizing information on said computer form and for facilitating data entry into or output from said computer form, each separate field including one of a label, an interactive function for data input into said computer form, and an interactive function for data output from said computer form, each control item being spatially independent of a neighboring control item, such that a spatial organization of control items in said computer form can be altered for a desired application.

65. The method of claim 64, wherein each vertical partition has the same width.

* * * * *